(12) United States Patent
Huang et al.

(10) Patent No.: US 11,228,513 B2
(45) Date of Patent: Jan. 18, 2022

(54) TRAFFIC MEASUREMENT METHOD, DEVICE, AND SYSTEM

(71) Applicant: HUAWEI TECHNOLOGIES CO., LTD., Guangdong (CN)

(72) Inventors: Qun Huang, Shenzhen (CN); Runhui Li, Shenzhen (CN); Yong Huang, Shenzhen (CN); Gong Zhang, Shenzhen (CN); Pak-Ching Lee, Hong Kong (CN); Lu Tang, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 16/776,783

(22) Filed: Jan. 30, 2020

(65) Prior Publication Data

US 2020/0169485 A1 May 28, 2020

Related U.S. Application Data

(63) Continuation of application No. PCT/CN2018/092519, filed on Jun. 22, 2018.

(30) Foreign Application Priority Data

Aug. 4, 2017 (CN) .......................... 201710662793.7

(51) Int. Cl.
*G06F 15/173* (2006.01)
*H04L 12/26* (2006.01)
(Continued)

(52) U.S. Cl.
CPC .......... *H04L 43/062* (2013.01); *H04L 9/0643* (2013.01); *H04L 43/0811* (2013.01);
(Continued)

(58) Field of Classification Search
USPC ................................ 709/224, 234, 236, 231
See application file for complete search history.

(56) References Cited

U.S. PATENT DOCUMENTS 6,820,129 B1 11/2004 Courey, Jr.
6,928,054 B1 8/2005 Montuno et al.
(Continued)

FOREIGN PATENT DOCUMENTS

CN 101459560 A 6/2009
CN 102026141 A 4/2011
(Continued)

OTHER PUBLICATIONS

Matsui et al., "Optimal Flow Allocation for Distributed Packet Networks," Systems-Computers-Controls, vol. 10, No. 6, XP000809790, Nov. 1, 1979, 7 pages.
(Continued)

*Primary Examiner* — Lan Dai T Truong
(74) *Attorney, Agent, or Firm* — Fish & Richardson P.C.

(57) ABSTRACT

One example packet processing device includes a buffer, and the packet processing device obtains a to-be-measured packet. In response to determining that occupied storage space in the buffer is less than a preset threshold, the packet processing device reads the to-be-measured information from the buffer, and modifies, based on the to-be-measured information and a first algorithm, a pieces of data in first measurement data corresponding to the to-be-measured packet, where a is a positive integer. In response to determining that occupied storage space in the buffer is greater than or equal to a preset threshold, the packet processing device modifies, based on to-be-measured information and a second algorithm, w pieces of data in second measurement data corresponding to the to-be-measured packet, where w is a positive integer, and w is less than a.

15 Claims, 15 Drawing Sheets

Packet          Mapping relationship          Linear subspace

(51) Int. Cl.
*H04L 9/06* (2006.01)
*H04L 12/717* (2013.01)

(52) U.S. Cl.
CPC .......... *H04L 43/0894* (2013.01); *H04L 43/16* (2013.01); *H04L 45/42* (2013.01)

(56) References Cited

U.S. PATENT DOCUMENTS

| | | | |
|---|---|---|---|
| 7,640,298 B2* | 12/2009 | Berg | ............ H04L 29/06 709/203 |
| 2003/0202471 A1 | 10/2003 | Murooka et al. | |
| 2006/0075489 A1 | 4/2006 | Ganguly et al. | |
| 2007/0244993 A1 | 10/2007 | Volodarsky et al. | |
| 2008/0101354 A1* | 5/2008 | Arndt | ............ H04L 69/22 370/389 |
| 2012/0047505 A1 | 2/2012 | Branson et al. | |

FOREIGN PATENT DOCUMENTS

| | | |
|---|---|---|
| CN | 102375877 A | 3/2012 |
| CN | 103647670 A | 3/2014 |
| CN | 104301248 A | 1/2015 |
| CN | 106937052 A | 7/2017 |
| CN | 107566206 A | 1/2018 |
| KR | 20010024661 A | 3/2001 |
| KR | 20010082018 A | 8/2001 |
| KR | 20030038089 A | 5/2003 |

OTHER PUBLICATIONS

Sadasivan et al., "Architecture for IP Flow Information Export", RFC5470, Mar. 2009, 31 pages.
Kobayashi et al., "IP Flow Information Export (IPFIX) Mediation: Framework" RFC6183, Apr. 2011, 29 pages.
Office Action issue in Chinese Application No. 201710662793.7 dated Jul. 19, 2019, 13 pages (With English Translation).
Chen et al., "Robust Network Compressive Sensing," Proceedings of the 20th annual international conference on Mobile computing and networking (MobiCom'14,) Maui, Hawaii, USA, Sep. 7-11, 2014, 12 pages.
Candès et al., "Robust Uncertainty Principles: Exact Signal Reconstruction from Highly Incomplete Frequency Information", IEEE Transactions on Information Theory, vol. 52, No. 2, Feb. 2006, 21 pages.
PCT International Search Report and Written Opinion in International Application No. PCT/CN2018/092519 dated Sep. 10, 2018, 19 pages (With English Translation).
Office Action issued in Korean Application No. 2020-7005001 dated Nov. 25, 2021, 4 pages (with English translation).

* cited by examiner

TRAFFIC MEASUREMENT METHOD, DEVICE, AND SYSTEM

CROSS-REFERENCE TO RELATED APPLICATIONS

This application is a continuation of International Application No. PCT/CN2018/092519, filed on Jun. 22, 2018, which claims priority to Chinese Patent Application No. 201710662793.7, filed on Aug. 4, 2017. The disclosures of the aforementioned applications are hereby incorporated by reference in their entireties.

TECHNICAL FIELD

Embodiments of this application relate to the field of communications technologies, and in particular, to a traffic measurement method, a device, and a system.

BACKGROUND

Advances in big data and artificial intelligence technologies promote the development of network intelligence. A basis of network intelligence is network-wide data measurement. Network-wide data measurement requires information abstraction and collection of statistics about information that are performed based on each packet.

Currently, a traffic measurement technology based on a sketch-based algorithm exists in the prior art. As shown in FIG. 1, in the sketch-based algorithm, a large quantity of high-dimensional data information may be mapped into low-dimensional linear subspace, and an operation is performed on a data structure in the low-dimensional linear subspace, so as to maintain high-precision query for a to-be-measured indicator. The linear subspace is formed in a specified data structure, and is usually a two-dimensional or higher-dimensional matrix.

The sketch-based algorithm usually supports limited queries. For example, a Count-Min Sketch algorithm among sketch-based algorithms may be used to query "whether a size of a flow f exceeds a threshold", but all possible data flows need to be enumerated when the Count-Min Sketch algorithm is used to "find all flows exceeding the threshold". However, enumerating a massive quantity of data flows is unacceptable in terms of computation. To improve a query capability of the sketch-based algorithm, many sketch-based algorithms need to maintain extra data structures, and therefore extra resource overheads are caused. In addition, for different measurements to be made, different sketch-based measurement algorithms are required. When one actual measurement task requires a variety of measurements to be made, a plurality of sketch-based algorithms need to be deployed simultaneously. Simultaneous running of the plurality of sketch-based algorithms causes quite high resource overheads.

Because the sketch-based algorithm causes high resource overheads and relatively low processing efficiency, a large quantity of unmeasured packets usually pile up, and a large quantity of resources are used for packet measurement. Consequently, normal packet forwarding is affected and a network throughput is relatively low.

SUMMARY

Embodiments of this application provide a traffic measurement method, a device, and a system, to reduce resource overheads and improve a network throughput.

To achieve the foregoing objectives, the following technical solutions are used in the embodiments of this application:

According to a first aspect, an embodiment of this application provides a traffic measurement method, applied to a packet processing device, where the packet processing device includes a buffer, and the method includes the following steps: first obtaining, by the packet processing device, a to-be-measured packet; and if occupied storage space in the buffer is less than a preset threshold, writing, by the packet processing device, to-be-measured information of the to-be-measured packet into the buffer, where the to-be-measured information includes a flow identifier of the to-be-measured packet and a traffic volume of the to-be-measured packet, then reading, by the packet processing device, the to-be-measured information from the buffer, and further modifying, by the packet processing device based on the to-be-measured information and a first algorithm, a pieces of data corresponding to the to-be-measured packet in first measurement data, where a is a positive integer; or if occupied storage space in the buffer is greater than or equal to a preset threshold, modifying, based on to-be-measured information and a second algorithm, w pieces of data corresponding to the to-be-measured packet in second measurement data, where w is a positive integer, and w is less than a.

In this way, because w is less than a, fewer pieces of data in measurement data that are corresponding to a to-be-measured packet need to be modified when the second algorithm is used to process the to-be-measured packet than when the first algorithm is used. Therefore, processing the to-be-measured packet by using the second algorithm is faster and more efficient, and introduces lower resource overheads. The packet processing device determines whether the buffer is relatively full to determine whether load of the packet processing device in processing the to-be-measured packet based on the first algorithm is relatively heavy, so that when the load of the packet processing device in processing the to-be-measured packet based on the first algorithm is relatively heavy, the packet processing device switches to process the to-be-measured packet by using the faster second algorithm, thereby ensuring a normal packet forwarding service and improving a network throughput.

With reference to the first aspect, in a possible implementation, the a pieces of data are values of a counters, and the w pieces of data are values of w counters.

In this way, during processing of the to-be-measured packet, data in the first measurement data and the second measurement data that is modified by the packet processing device is specifically the value of the counter.

With reference to the first aspect and the foregoing possible implementation, in another possible implementation, the first algorithm includes a hash function, the first measurement data includes data in c locations, where c is a positive integer. The modifying, by the packet processing device based on the to-be-measured information and a first algorithm, a pieces of data in first measurement data that are corresponding to the to-be-measured packet includes: determining, by the packet processing device, u locations from the c locations based on the flow identifier of the to-be-measured packet and the hash function, where u is a positive integer, and u is less than or equal to c; and modifying, by the packet processing device, a pieces of data in the u locations based on the traffic volume of the to-be-measured packet, where u is less than or equal to a.

In other words, during processing of the to-be-measured packet, the packet processing device modifies the a pieces of data in the u locations.

With reference to the first aspect and the foregoing possible implementations, in another possible implementation, after the reading the to-be-measured information from the buffer, the method further includes: deleting the to-be-measured information of the to-be-measured packet from the buffer.

In this way, the buffer can free up space to store to-be-measured information of a newly obtained to-be-measured packet.

With reference to the first aspect and the foregoing possible implementations, in another possible implementation, a flow table is stored in the packet processing device, the second measurement data includes data in the flow table, and the flow table includes a correspondence between the flow identifier and first data r. The modifying, by the packet processing device based on the to-be-measured information and a second algorithm, w pieces of data in second measurement data that are corresponding to the to-be-measured packet includes: modifying, based on the to-be-measured information and the second algorithm, first data $r_f$ that is corresponding to the to-be-measured packet and that is in the second measurement data.

In this case, the packet processing device modifies data that is corresponding to the to-be-measured packet and that is in the second measurement data.

With reference to the first aspect and the foregoing possible implementations, in another possible implementation, the modifying, by the packet processing device based on the to-be-measured information and the second algorithm, first data $r_f$ that is corresponding to the to-be-measured packet and that is in the second measurement data includes: when the flow table includes a flow identifier f of the to-be-measured packet, updating first data $r_f$ that is corresponding to the to-be-measured packet and that is in the flow table to a sum of the first data $r_f$ corresponding to the to-be-measured packet and the traffic volume of the to-be-measured packet.

With reference to the first aspect and the foregoing possible implementations, in another possible implementation, a flow table is stored in the packet processing device, and the flow table includes a correspondence between the flow identifier and each of first data r and second data d. When the flow table does not include a flow identifier f of the to-be-measured packet and the flow table is full, before the modifying, by the packet processing device based on the to-be-measured information and a second algorithm, w pieces of data in second measurement data that are corresponding to the to-be-measured packet, the method further includes: calculating a decrement value ê; updating first data r corresponding to each flow identifier included in the flow table to a difference between the first data r and the decrement value ê; updating second data d corresponding to each flow identifier included in the flow table to a sum of the second data d and the decrement value ê; and deleting, from the flow table, a correspondence between a flow identifier meeting a first preset condition and each of the first data r and the second data d, where the flow identifier meeting the first preset condition is a flow identifier whose corresponding updated first data r is less than or equal to 0.

A value of the first data r may indicate a traffic volume of a data flow corresponding to the flow identifier. When the flow table does not include the flow identifier f of the to-be-measured packet and the flow table is full, the packet processing device may delete, from the flow table, one or more flow identifiers whose corresponding first data r is relatively small. Space of the flow table is freed up through a deletion operation, to be used to store a flow identifier of a data flow with a relatively large traffic volume.

With reference to the first aspect and the foregoing possible implementations, in another possible implementation, the flow table includes a correspondence between the flow identifier and each of the first data r, the second data d, and third data e. When the flow table does not include the flow identifier f of the to-be-measured packet and the flow table is full, the modifying, by the packet processing device based on the to-be-measured information and a second algorithm, w pieces of data in second measurement data that are corresponding to the to-be-measured packet includes: if the traffic volume of the to-be-measured packet is greater than the decrement value ê, setting a difference between the traffic volume of the to-be-measured packet and the decrement value ê to first data $r_f$ corresponding to the to-be-measured packet; setting the decrement value ê to second data $d_f$ corresponding to the to-be-measured packet: setting a total decrement traffic volume E to third data $e_r$ corresponding to the to-be-measured packet: and inserting, into the flow table, a correspondence between the flow identifier f of the to-be-measured packet and each of the first data $r_f$ corresponding to the to-be-measured packet, the second data $d_f$ corresponding to the to-be-measured packet, and the third data $e_r$ corresponding to the to-be-measured packet.

When the flow table does not include the flow identifier f of the to-be-measured packet and the flow table is full, the packet processing device may insert the flow identifier of the to-be-measured packet into the flow table after performing the deletion operation.

With reference to the first aspect and the foregoing possible implementations, in another possible implementation, the method further includes: updating, by the packet processing device, the total decrement traffic volume E to a sum of the total decrement traffic volume E and the decrement value ê.

After the deletion operation, the decrement value may be added to the total decrement traffic volume E.

With reference to the first aspect and the foregoing possible implementations, in another possible implementation, the calculating, by the packet processing device, a decrement value ê includes: sorting the traffic volume of the to-be-measured packet and the first data r corresponding to the flow identifiers included in the flow table in order of values, and denoting the first two values after sorting as $R_1$ and $R_2$ and a last value after sorting as $R_k$; and calculating the decrement value ê based on $R_1, R_2, R_k$, and the following expression:

$$\hat{e} = \sqrt[\theta]{1 - \delta R_k}, \text{ where } \theta = \log_b \frac{1}{2}, b = \frac{R_1 - 1}{R_2 - 1},$$

and δ represents a constant.

In this way, a long tail distribution may be obtained through fitting based on values of all first data r, and a long tail part is deleted, by selecting a threshold (that is, the decrement value), from the distribution obtained through fitting.

With reference to the first aspect and the foregoing possible implementations, in another possible implementation, a flow table is stored in the packet processing device, and the flow table includes a correspondence between the flow identifier and each of first data r and third data e. When the flow table does not include a flow identifier f of the to-be-measured packet and the flow table is not full, the modifying, by the packet processing device based on the to-be-measured information and a second algorithm, w pieces of data in second measurement data that are corresponding to the to-be-measured packet includes: setting the traffic volume of the to-be-measured packet to first data $r_f$ corresponding to the to-be-measured packet; setting a total decrement traffic volume E to third data $e_r$ corresponding to the to-be-measured packet; and inserting, into the flow table, a correspondence between the flow identifier f of the to-be-measured packet and each of the first data $r_f$ corresponding to the to-be-measured packet and the third data $e_r$ corresponding to the to-be-measured packet.

When the flow table does not include the flow identifier f of the to-be-measured packet and the flow table is not full, the flow identifier corresponding to the to-be-measured packet may be inserted into the flow table.

With reference to the first aspect and the foregoing possible implementations, in another possible implementation, the flow table includes an entry, and the entry includes a correspondence between the flow identifier and each of the first data r, the second data d, and the third data e, and the first data r, the second data d, and the third data e are respectively values of three counters.

In this way, the first data r, the second data d, and the third data e that are corresponding to the flow identifier may be specifically values of counters.

With reference to the first aspect and the foregoing possible implementations, in another possible implementation, the second measurement data includes a local total traffic volume, and if the occupied storage space in the buffer is greater than or equal to the preset threshold, the method further includes: updating, by the packet processing device, the local total traffic volume to a sum of the local total traffic volume and the traffic volume of the to-be-measured packet.

In other words, each time a new to-be-measured packet is obtained, the packet processing device may add a traffic volume of the new to-be-measured packet to the local total traffic volume.

With reference to the first aspect and the foregoing possible implementations, in another possible implementation, the flow identifier is a 5-tuple, and the 5-tuple includes a source Internet Protocol (internet protocol, IP) address, a source port, a destination IP address, a destination port, and a transport layer protocol; or the flow identifier is a 2-tuple, and the 2-tuple includes a source IP address and a destination IP address.

In this way, a flow identifier used to identify a data flow can be relatively flexible.

With reference to the first aspect and the foregoing possible implementations, in another possible implementation, the method further includes: sending, by the packet processing device, the first measurement data and/or the second measurement data to a network controller, where the first measurement data and/or the second measurement data are/is used by the network controller to calculate target measurement data.

In this way, the network controller can calculate the target measurement data based on the received first measurement data and/or second measurement data, and perform some other processing.

With reference to the first aspect and the foregoing possible implementations, in another possible implementation, the sending, by the packet processing device, the first measurement data and/or the second measurement data to a network controller includes: sending the first measurement data and/or the second measurement data to the network controller based on a preset period; or receiving, by the packet processing device, a measurement data request message sent by the network controller, and sending the first measurement data and/or the second measurement data to the network controller in response to the measurement data request message.

In this way, the packet processing device may periodically send measurement data to the network controller, or send measurement data to the network controller after receiving an instruction from the network controller.

With reference to the first aspect and the foregoing possible implementations, in another possible implementation, the flow identifier of the to-be-measured packet is a target flow identifier, and before the obtaining a to-be-measured packet, the method further includes: receiving an instruction message sent by the network controller, where the instruction message includes the target flow identifier.

In this way, the packet processing device performs traffic measurement for only a to-be-measured packet with the target flow identifier.

With reference to the first aspect and the foregoing possible implementations, in another possible implementation, a data structure corresponding to the flow table is a hash table or a binary tree.

In this way, the flow table may be specifically implemented in a form of a hash table or a binary tree.

With reference to the first aspect and the foregoing possible implementations, in another possible implementation, a software-defined network (software defined network. SDN) software switch is configured on the packet processing device.

In this way, the packet processing device may be specifically a device on a data plane in a software-defined network SDN.

According to a second aspect, an embodiment of this application provides a traffic measurement method, including: receiving, by a network controller, m pieces of first measurement data respectively sent by m packet processing devices and n pieces of second measurement data respectively sent by n packet processing devices, where the first measurement data is obtained based on a first algorithm, the second measurement data is obtained based on a second algorithm, and both m and n are non-negative integers; combining, by the network controller, the m pieces of first measurement data to obtain global first measurement data; combining, by the network controller, the n pieces of second measurement data to obtain global second measurement data; and calculating, by the network controller, target measurement data based on the global first measurement data and the global second measurement data.

In this way, the network controller can comprehensively calculate traffic data in a network based on the first measurement data and the second measurement data that are reported by the packet processing devices.

With reference to the second aspect, in a possible implementation, the target measurement data and the global first measurement data have a same data structure.

In this way, the target measurement data obtained by the network controller, the first measurement data obtained based on the first algorithm, and the global first measurement data have a same data structure. It can be understood as that the network controller converts the global second measurement data obtained based on the second algorithm into a form of the global first measurement data, to recover traffic information that is lost in a deletion operation of the second algorithm, so that the target measurement data obtained based on the global first measurement data and the global second measurement data can have measurement precision equivalent to that corresponding to the first algorithm.

With reference to the second aspect and the foregoing possible implementation, in another possible implementation, each piece of first measurement data includes p rows and q columns of elements. The combining, by the network controller, the m pieces of first measurement data to obtain global first measurement data includes: combining each m elements that are of the m pieces of first measurement data and that are in corresponding locations, to obtain the global first measurement data, where the global first measurement data includes p rows and q columns of elements.

With reference to the second aspect and the foregoing possible implementations, in another possible implementation, each piece of second measurement data includes a local total traffic volume and a flow table, the flow table includes at least one entry, and the entry is in a one-to-one correspondence with a flow identifier. The combining, by the network controller, the n pieces of second measurement data to obtain global second measurement data includes: adding n local total traffic volumes in the n pieces of second measurement data to obtain a global total traffic volume; and combining entries of n flow tables corresponding to the n pieces of second measurement data, to obtain a global flow table, where in the global flow table, the flow identifier is in a one-to-one correspondence with the entry. The global total traffic volume and the global flow table are the global second measurement data.

With reference to the second aspect and the foregoing possible implementations, in another possible implementation, the entry includes a flow identifier and traffic data corresponding to the flow identifier. The combining, by the network controller, entries of n flow tables corresponding to the n pieces of second measurement data includes: in the entries of the n flow tables corresponding to the n pieces of second measurement data, for a plurality of entries having a same flow identifier, adding traffic data in the plurality of entries to combine the plurality of entries into one entry of the global flow table; and using each of entries having different flow identifiers as one entry of the global flow table.

In this way, in the global flow table, flow identifiers are corresponding to a same entry.

With reference to the second aspect and the foregoing possible implementations, in another possible implementation, the calculating, by the network controller, target measurement data based on the global first measurement data and the global second measurement data includes: constructing an optimization target function based on the global first measurement data and the global second measurement data; and calculating the target measurement data based on a convex optimization algorithm and the optimization target function, where an expression of the optimization target function is: minimize $$\left(\alpha|T|_* + \beta|x|_1 + \frac{1}{2\gamma}|y|_F^2\right),$$

and the optimization target function meets the following constraints: constraint 1: $T=N+sk(x+y)$ constraint 2: $|x|_1+|y|_1=V$; and constraint 3: $\forall s \in H, r_s+d_s \leq x_s \leq r_s+e_s$, where "minimize" represents calculation of an independent variable value that minimizes the optimization target function, T represents the target measurement data, N represents the global flow table, V represents the global total traffic volume, H represents the global first measurement data, x represents a traffic volume of a data flow corresponding to a flow identifier included in H, $x_s$ represents a traffic volume of a data flow corresponding to a flow identifier s, y represents a traffic volume that is of data flows not included in H and that is in a traffic volume, of a data flow, measured based on the second algorithm, x+y represents the traffic volume, of the data flow, measured based on the second algorithm, and sk(x+y) represents a result obtained by using x+y as input and by invoking the first algorithm. $|T|_*$ represents a nuclear norm of T and is defined as a sum of all singular values of a matrix, $|x|_1$ represents an $L_1$ norm of a vector x and is defined as a sum of absolute values of all data in x, and $|y|_F^2$ represents a Frobenius norm of a vector y and is defined as a sum of squares of all the data in x, where calculation expressions of α, β, and γ are respectively: $\alpha=(\sqrt{P_N}+\sqrt{Q_N})\sqrt{\eta(N)}$, $\beta=\sqrt{2\log(m_x n_x)}$, and $\gamma=10\sigma_y$, where $P_N$ and $Q_N$ respectively represent a length and a width of a matrix N, η(N) represents an average of data in N, $m_x$ and $n_x$ respectively represent a length and a width of the vector x, and $\sigma_y$ represents a standard deviation of all data in y.

There is no close-form solution for a general convex optimization problem, that is, an expression of a function relationship between output and input cannot be explicitly given. In this solution finding manner, an approximation method is used to find an approximate local optimal solution through search within a particular range based on a constraint rule, to substitute for an expected global optimal solution.

With reference to the second aspect and the foregoing possible implementations, in another possible implementation, the convex optimization algorithm includes an interior-point method, an alternating direction method of multipliers (alternating direction method of multipliers, ADMM), or a subgradient algorithm.

With reference to the second aspect and the foregoing possible implementations, in another possible implementation, the calculating, by the network controller, target measurement data based on the global first measurement data and the global second measurement data includes: calculating the target measurement data based on the global first measurement data, the global second measurement data, and the following expression: $T=N+sk(x)$ where T represents the target measurement data, N represents the global flow table, x represents a traffic volume of a data flow corresponding to a flow identifier included in H, x represents a traffic volume, of a data flow, measured based on the second algorithm, and sk(x) represents a result obtained by using x as input and by invoking the first algorithm.

In this way, the network controller can obtain the target measurement data through simple calculation based on x and N.

With reference to the second aspect and the foregoing possible implementations, in another possible implementation, the global flow table includes an entry, the entry includes a correspondence between a flow identifier and each of first data r and second data d, and the traffic volume of the data flow corresponding to x is a sum of the first data r and the second data d that are corresponding to a flow identifier of the data flow.

In this way, the network controller can obtain x based on r and d, and obtain the target measurement data through simple calculation based on x and N.

With reference to the second aspect and the foregoing possible implementations, in another possible implementation, the global flow table includes an entry, the entry includes a correspondence between a flow identifier and each of first data r, second data d, and third data e, and the traffic volume of the data flow corresponding to x is a sum of the first data r, the second data d, and the third data e that are corresponding to a flow identifier of the data flow.

In this way, the network controller can obtain x based on r, d, and e, and obtain the target measurement data through simple calculation based on x and N.

With reference to the second aspect and the foregoing possible implementations, in another possible implementation, the receiving, by a network controller, m pieces of first measurement data respectively sent by m packet processing devices and n pieces of second measurement data respectively sent by n packet processing devices includes: periodically receiving m pieces of first measurement data respectively sent by the m packet processing devices and n pieces of second measurement data respectively sent by the n packet processing devices. Alternatively, before the receiving, by a network controller, m pieces of first measurement data respectively sent by m packet processing devices and n pieces of second measurement data respectively sent by n packet processing devices, the method further includes: sending a measurement data request message to each packet processing device.

In this way, the network controller may periodically receive measurement data sent by the packet processing devices, or may send the measurement data request message to each of the packet processing devices when measurement data needs to be collected.

With reference to the second aspect and the foregoing possible implementations, in another possible implementation, before the receiving, by a network controller, m pieces of first measurement data respectively sent by m packet processing devices and n pieces of second measurement data respectively sent by n packet processing devices, the method further includes: sending an instruction message to each packet processing device, where the instruction message carries a target flow identifier corresponding to the to-be-measured packet processing device. That the to-be-measured packet processing device is corresponding to the target flow identifier means the following: the to-be-measured packet processing device is a last-hop device of a data flow corresponding to the target flow identifier; or the to-be-measured packet processing device is a first-hop device of a data flow corresponding to the target flow identifier; or the to-be-measured packet processing device is a receive-end device of a data flow corresponding to the target flow identifier; or the to-be-measured packet processing device is a transmit-end device of a data flow corresponding to the target flow identifier.

In this way, the network controller may pre-configure a correspondence between the packet processing device and the target flow identifier by using a configuration policy, so that a traffic volume of one packet in the network is measured and reported by only one packet processing device in the network instead of being measured and reported by a plurality of packet processing devices. Therefore, packets separately measured by packet processing devices in the network do not overlap each other, thereby avoiding repeated measurement and achieving accurate network traffic measurement.

With reference to the second aspect and the foregoing possible implementations, in another possible implementation, a software-defined network SDN controller is configured on the network controller.

In this way, the network controller may be specifically a controller on a control plane in a software-defined network SDN.

According to a third aspect, an embodiment of this application provides a packet processing device, including at least one processor, a memory, a buffer, a communications interface, and a bus, where the at least one processor, the memory, and the buffer are connected to each other by using the bus. The communications interface is configured to obtain a to-be-measured packet when the packet processing device is a packet forwarding device or a packet receiving device. The memory is configured to store an instruction. The processor is configured to invoke the instruction stored in the memory to implement the following operations: obtaining a to-be-measured packet when the packet processing device is a packet transmitting device; and if occupied storage space in the buffer is less than a preset threshold, writing to-be-measured information of the to-be-measured packet into the buffer, where the to-be-measured information includes a flow identifier of the to-be-measured packet and a traffic volume of the to-be-measured packet, reading the to-be-measured information from the buffer, and modifying, based on the to-be-measured information and a first algorithm, a pieces of data in first measurement data that are corresponding to the to-be-measured packet, where a is a positive integer; or if occupied storage space in the buffer is greater than or equal to a preset threshold, modifying, based on to-be-measured information and a second algorithm, w pieces of data in second measurement data that are corresponding to the to-be-measured packet, where w is a positive integer, and w is less than a. The buffer is configured to store the to-be-measured information after the processor writes the to-be-measured information of the to-be-measured packet into the buffer.

With reference to the third aspect, in a possible implementation, the a pieces of data are values of a counters, and the w pieces of data are values of w counters.

With reference to the third aspect and the foregoing possible implementation, in another possible implementation, the first algorithm includes a hash function, the first measurement data includes data in c locations, where c is a positive integer, and the processor is specifically configured to: determine u locations from the c locations based on the flow identifier of the to-be-measured packet and the hash function, where u is a positive integer, and u is less than or equal to c; and modify a pieces of data in the u locations based on the traffic volume of the to-be-measured packet, where u is less than or equal to a.

With reference to the third aspect and the foregoing possible implementations, in another possible implementation, the communications interface is further configured to: send the first measurement data and/or the second measurement data to a network controller, where the first measurement data and/or the second measurement data are/is used by the network controller to calculate target measurement data.

With reference to the third aspect and the foregoing possible implementations, in another possible implementation, the flow identifier of the to-be-measured packet is a target flow identifier, and the communications interface is further configured to: before obtaining the to-be-measured packet, receive an instruction message sent by the network controller, where the instruction message includes the target flow identifier.

According to a fourth aspect, an embodiment of this application provides a network controller, including at least one processor, a memory, a communications interface, and a bus, where the at least one processor and the memory are connected to each other by using the bus. The communications interface is configured to receive m pieces of first measurement data respectively sent by m packet processing devices and n pieces of second measurement data respectively sent by n packet processing devices, where the first measurement data is obtained based on a first algorithm, the second measurement data is obtained based on a second algorithm, and both m and n are non-negative integers. The memory is configured to store an instruction. The processor is configured to invoke the instruction stored in the memory to implement the following operations: combining the m pieces of first measurement data to obtain global first measurement data combining the n pieces of second measurement data to obtain global second measurement data; and calculating target measurement data based on the global first measurement data and the global second measurement data.

With reference to the fourth aspect, in a possible implementation, the target measurement data and the global first measurement data have a same data structure.

With reference to the fourth aspect and the foregoing possible implementations, in another possible implementation, each piece of first measurement data includes p rows and q columns of elements, and the processor is specifically configured to: combine each m elements that are of the m pieces of first measurement data and that are in corresponding locations, to obtain the global first measurement data, where the global first measurement data includes p rows and q columns of elements.

With reference to the fourth aspect and the foregoing possible implementations, in another possible implementation, each piece of second measurement data includes a local total traffic volume and a flow table, the flow table includes at least one entry, the entry is in a one-to-one correspondence with a flow identifier, and the processor is specifically configured to: add n local total traffic volumes in the n pieces of second measurement data to obtain a global total traffic volume; and combine entries of n flow tables corresponding to the n pieces of second measurement data, to obtain a global flow table, where in the global flow table, the flow identifier is in a one-to-one correspondence with the entry, and the global total traffic volume and the global flow table are the global second measurement data.

With reference to the fourth aspect and the foregoing possible implementations, in another possible implementation, the communications interface is further configured to: before receiving the m pieces of first measurement data respectively sent by the m packet processing devices and the n pieces of second measurement data respectively sent by the n packet processing devices, send an instruction message to each packet processing device, where the instruction message carries a target flow identifier corresponding to the to-be-measured packet processing device. That the to-be-measured packet processing device is corresponding to the target flow identifier means the following: the to-be-measured packet processing device is a last-hop device of a data flow corresponding to the target flow identifier; or the to-be-measured packet processing device is a first-hop device of a data flow corresponding to the target flow identifier; or the to-be-measured packet processing device is a receive-end device of a data flow corresponding to the target flow identifier; or the to-be-measured packet processing device is a transmit-end device of a data flow corresponding to the target flow identifier.

According to a fifth aspect, an embodiment of this application provides a packet processing device, including a buffer, an obtaining unit, a write unit, a read unit, a first modification unit, and a second modification unit. The obtaining unit is configured to obtain a to-be-measured packet. The write unit is configured to: if occupied storage space in the buffer is less than a preset threshold, write to-be-measured information of the to-be-measured packet into the buffer, where the to-be-measured information includes a flow identifier of the to-be-measured packet and a traffic volume of the to-be-measured packet. The buffer is configured to store the to-be-measured information after the write unit writes the to-be-measured information into the buffer. The read unit is configured to read the to-be-measured information from the buffer. The first modification unit is configured to modify, based on the to-be-measured information and a first algorithm, a pieces of data in first measurement data that are corresponding to the to-be-measured packet, where a is a positive integer. The second modification unit is configured to: if occupied storage space in the buffer is greater than or equal to a preset threshold, modify, based on to-be-measured information and a second algorithm, w pieces of data in second measurement data that are corresponding to the to-be-measured packet, where w is a positive integer, and w is less than a.

With reference to the fifth aspect, in a possible implementation, the a pieces of data are values of a counters, and the w pieces of data are values of w counters.

With reference to the fifth aspect and the foregoing possible implementation, in another possible implementation, the first algorithm includes a hash function, the first measurement data includes data in c locations, where c is a positive integer, and the first modification unit is specifically configured to: determine u locations from the c locations based on the flow identifier of the to-be-measured packet and the hash function, where u is a positive integer, and u is less than or equal to c; and modify a pieces of data in the u locations based on the traffic volume of the to-be-measured packet, where u is less than or equal to a.

With reference to the fifth aspect and the foregoing possible implementations, in another possible implementation, the device further includes a deletion unit, configured to: after the read unit reads the to-be-measured information from the buffer, delete the to-be-measured information of the to-be-measured packet from the buffer.

With reference to the fifth aspect and the foregoing possible implementations, in another possible implementation, a flow table is stored in the packet processing device, the second measurement data includes data in the flow table, the flow table includes a correspondence between the flow identifier and first data r, and the second modification unit is specifically configured to: modify, based on the to-be-measured information and the second algorithm, first data $r_f$ that is corresponding to the to-be-measured packet and that is in the second measurement data.

With reference to the fifth aspect and the foregoing possible implementations, in another possible implementation, the second modification unit is specifically configured to: when the flow table includes a flow identifier f of the to-be-measured packet, update first data $r_f$ that is corresponding to the to-be-measured packet and that is in the flow table to a sum of the first data $r_f$ corresponding to the to-be-measured packet and the traffic volume of the to-be-measured packet.

With reference to the fifth aspect and the foregoing possible implementations, in another possible implementation, a flow table includes a correspondence between the flow identifier and each of first data r and second data d, and the device further includes a processing unit, configured to: when the flow table does not include a flow identifier f of the to-be-measured packet and the flow table is full, before the second modification unit modifies, based on the to-be-measured information and the second algorithm, the w pieces of data in the second measurement data that are corresponding to the to-be-measured packet, calculate a decrement value ê; update first data r corresponding to each flow identifier included in the flow table to a difference between the first data r and the decrement value ê; update second data d corresponding to each flow identifier included in the flow table to a sum of the second data d and the decrement value ê; and delete, from the flow table, a correspondence between a flow identifier meeting a first preset condition and each of the first data r and the second data d. The flow identifier meeting the first preset condition is a flow identifier whose corresponding updated first data r is less than or equal to 0.

With reference to the fifth aspect and the foregoing possible implementations, in another possible implementation, the flow table includes a correspondence between the flow identifier and each of the first data r, the second data d, and third data e, and the second modification unit is specifically configured to: when the flow table does not include the flow identifier f of the to-be-measured packet and the flow table is full, if the traffic volume of the to-be-measured packet is greater than the decrement value ê, set a difference between the traffic volume of the to-be-measured packet and the decrement value ê to first data $r_f$ corresponding to the to-be-measured packet; set the decrement value ê to second data $d_f$ corresponding to the to-be-measured packet; set a total decrement traffic volume E to third data $e_f$ corresponding to the to-be-measured packet; and insert, into the flow table, a correspondence between the flow identifier f of the to-be-measured packet and each of the first data $r_f$ corresponding to the to-be-measured packet, the second data $d_f$ corresponding to the to-be-measured packet, and the third data $e_r$ corresponding to the to-be-measured packet.

With reference to the fifth aspect and the foregoing possible implementations, in another possible implementation, the device further includes an updating unit, configured to update the total decrement traffic volume E to a sum of the total decrement traffic volume E and the decrement value ê.

With reference to the fifth aspect and the foregoing possible implementations, in another possible implementation, the processing unit is specifically configured to: sort the traffic volume of the to-be-measured packet and the first data r corresponding to the flow identifiers included in the flow table in order of values, and denote the first two values after sorting as $R_1$ and $R_2$ and a last value after sorting as $R_k$; and calculate the decrement value ê based on $R_1$, $R_2$, $R_k$, and the following expression:

$$\hat{e} = \sqrt[\theta]{1 - \delta R_k}, \text{ where } \theta = \log_b \frac{1}{2}, b = \frac{R_1 - 1}{R_2 - 1},$$

and δ represents a constant.

With reference to the fifth aspect and the foregoing possible implementations, in another possible implementation, a flow table includes a correspondence between the flow identifier and each of first data r and third data e, and the second modification unit is specifically configured to: when the flow table does not include a flow identifier f of the to-be-measured packet and the flow table is not full, set the traffic volume of the to-be-measured packet to first data $r_f$ corresponding to the to-be-measured packet; set a total decrement traffic volume E to third data $e_r$ corresponding to the to-be-measured packet; and insert, into the flow table, a correspondence between the flow identifier f of the to-be-measured packet and each of the first data $r_f$ corresponding to the to-be-measured packet and the third data $e_r$ corresponding to the to-be-measured packet.

With reference to the fifth aspect and the foregoing possible implementations, in another possible implementation, the flow table includes an entry, and the entry includes a correspondence between the flow identifier and each of the first data r, the second data d, and the third data e, and the first data r, the second data d, and the third data e are respectively values of three counters.

With reference to the fifth aspect and the foregoing possible implementations, in another possible implementation, the second measurement data includes a local total traffic volume, and the updating unit is further configured to update the local total traffic volume to a sum of the local total traffic volume and the traffic volume of the to-be-measured packet.

With reference to the fifth aspect and the foregoing possible implementations, in another possible implementation, the flow identifier is a 5-tuple, and the 5-tuple includes a source Internet Protocol IP address, a source port, a destination IP address, a destination port, and a transport layer protocol; or the flow identifier is a 2-tuple, and the 2-tuple includes a source IP address and a destination IP address.

With reference to the fifth aspect and the foregoing possible implementations, in another possible implementation, the device further includes a sending unit, configured to send the first measurement data and/or the second measurement data to a network controller, where the first measurement data and/or the second measurement data are/is used by the network controller to calculate target measurement data.

With reference to the fifth aspect and the foregoing possible implementations, in another possible implementation, the sending unit is specifically configured to send the first measurement data and/or the second measurement data to the network controller based on a preset period.

With reference to the fifth aspect and the foregoing possible implementations, in another possible implementation, the device further includes a receiving unit, configured to receive a measurement data request message sent by the network controller. The sending unit is specifically configured to send the first measurement data and/or the second measurement data to the network controller in response to the measurement data request message received by the receiving unit.

With reference to the fifth aspect and the foregoing possible implementations, in another possible implementation, the flow identifier of the to-be-measured packet is a target flow identifier, and the receiving unit is further configured to: before the obtaining unit obtains the to-be-measured packet, receive an instruction message sent by the network controller, where the instruction message includes the target flow identifier.

According to a sixth aspect, an embodiment of this application provides a network controller, including: a receiving unit, configured to receive m pieces of first measurement data respectively sent by m packet processing devices and n pieces of second measurement data respectively sent by n packet processing devices, where the first measurement data is obtained based on a first algorithm, the second measurement data is obtained based on a second algorithm, and both m and n are non-negative integers; a first combination unit, configured to combine the m pieces of first measurement data to obtain global first measurement data: a second combination unit, configured to combine the n pieces of second measurement data to obtain global second measurement data: and a calculation unit, configured to calculate target measurement data based on the global first measurement data and the global second measurement data.

With reference to the sixth aspect, in a possible implementation, the target measurement data and the global first measurement data have a same data structure.

With reference to the sixth aspect and the foregoing possible implementation, in another possible implementation, each piece of first measurement data includes p rows and q columns of elements, and the first combination unit is specifically configured to: combine each m elements that are of the m pieces of first measurement data and that are in corresponding locations, to obtain the global first measurement data, where the global first measurement data includes p rows and q columns of elements.

With reference to the sixth aspect and the foregoing possible implementations, in another possible implementation, each piece of second measurement data includes a local total traffic volume and a flow table, the flow table includes at least one entry, the entry is in a one-to-one correspondence with a flow identifier, and the second combination unit is specifically configured to: add n local total traffic volumes in the n pieces of second measurement data to obtain a global total traffic volume: and combine entries of n flow tables corresponding to the n pieces of second measurement data, to obtain a global flow table, where in the global flow table, the flow identifier is in a one-to-one correspondence with the entry, and the global total traffic volume and the global flow table are the global second measurement data.

With reference to the sixth aspect and the foregoing possible implementations, in another possible implementation, the entry includes a flow identifier and traffic data corresponding to the flow identifier, and the second combination unit is specifically configured to: in the entries of the n flow tables corresponding to the n pieces of second measurement data, for a plurality of entries having a same flow identifier, add traffic data in the plurality of entries to combine the plurality of entries into one entry of the global flow table; and use each of entries having different flow identifiers as one entry of the global flow table.

With reference to the sixth aspect and the foregoing possible implementations, in another possible implementation, the calculation unit is specifically configured to: construct an optimization target function based on the global first measurement data and the global second measurement data; and calculate the target measurement data based on a convex optimization algorithm and the optimization target function. An expression of the optimization target function is: minimize $$\left(\alpha|T|_* + \beta|x|_1 + \frac{1}{2\gamma}|y|_F^2\right);$$

the optimization target function meets the following constraints: constraint 1: T=N+sk(x+y); constraint 2: $|x|_1 + |y|_1 = V$; and constraint 3: $\forall s \in H, r_s + d_s \le x_s \le r_s + d_s + e_s$, where "minimize" represents calculation of an independent variable value that minimizes the optimization target function, T represents the target measurement data, N represents the global flow table, V represents the global total traffic volume. H represents the global first measurement data, x represents a traffic volume of a data flow corresponding to a flow identifier included in H, $x_s$ represents a traffic volume of a data flow corresponding to a flow identifier s, y represents a traffic volume that is of a data flow not included in H and that is in a traffic volume, of a data flow, measured based on the second algorithm, x+y represents the traffic volume, of the data flow, measured based on the second algorithm, and sk(x+y) represents a result obtained by using x+y as input and by invoking the first algorithm. $|T|_*$ represents a nuclear norm of T and is defined as a sum of all singular values of a matrix, $|x|_1$ represents an $L_1$ norm of a vector x and is defined as a sum of absolute values of all data in x, and $|y|_F^2$ represents a Frobenius norm of a vector y and is defined as a sum of squares of all the data in x, where calculation expressions of α, β, and γ are respectively: $\alpha = (\sqrt{P_N} + \sqrt{Q_N})\sqrt{\eta(N)}$, $\beta = \sqrt{2\log(m_x n_x)}$, and $\gamma = 10\sigma_y$, where $P_N$ and $Q_N$ respectively represent a length and a width of a matrix N, $\eta(N)$ represents an average of data in N, $m_x$ and $n_x$ respectively represent a length and a width of the vector x, and $\sigma_y$ represents a standard deviation of all data in y.

With reference to the sixth aspect and the foregoing possible implementations, in another possible implementation, the calculation unit is specifically configured to calculate the target measurement data based on the global first measurement data, the global second measurement data, and the following expression: T=N+sk(x), where T represents the target measurement data, N represents the global flow table, x represents a traffic volume of a data flow corresponding to a flow identifier included in H, x represents a traffic volume, of a data flow, measured based on the second algorithm, and sk(x) represents a result obtained by using x as input and by invoking the first algorithm.

With reference to the sixth aspect and the foregoing possible implementations, in another possible implementation, the global flow table includes an entry, the entry includes a correspondence between a flow identifier and each of first data r and second data d, and the traffic volume of the data flow corresponding to x is a sum of the first data r and the second data d that are corresponding to a flow identifier of the data flow.

With reference to the sixth aspect and the foregoing possible implementations, in another possible implementation, the entry includes a correspondence between a flow identifier and each of first data r, second data d, and third data e, and the traffic volume of the data flow corresponding to x is a sum of the first data r, the second data d, and the third data e that are corresponding to a flow identifier of the data flow.

With reference to the sixth aspect and the foregoing possible implementations, in another possible implementation, the receiving unit is specifically configured to periodically receive m pieces of first measurement data respectively sent by the m packet processing devices and n pieces of second measurement data respectively sent by the n packet processing devices.

With reference to the sixth aspect and the foregoing possible implementations, in another possible implementation, the network controller further includes a sending unit, configured to send a measurement data request message to each packet processing device.

With reference to the sixth aspect and the foregoing possible implementations, in another possible implementation, the sending unit is further configured to: before the receiving unit receives the m pieces of first measurement data respectively sent by the m packet processing devices and the n pieces of second measurement data respectively sent by the n packet processing devices, send an instruction message to each packet processing device, where the instruction message carries a target flow identifier corresponding to the to-be-measured packet processing device. That the to-be-measured packet processing device is corresponding to the target flow identifier means the following: the to-be-measured packet processing device is a last-hop device of a data flow corresponding to the target flow identifier; or the to-be-measured packet processing device is a first-hop device of a data flow corresponding to the target flow identifier; or the to-be-measured packet processing device is a receive-end device of a data flow corresponding to the target flow identifier; or the to-be-measured packet processing device is a transmit-end device of a data flow corresponding to the target flow identifier.

According to a seventh aspect, an embodiment of this application provides a packet processing device, including one or more processors and one or more memories. The one or more memories are coupled to the one or more processors. The one or more memories are configured to store computer program code, and the computer program code includes a computer instruction. When the one or more processors execute the computer instruction, the packet processing device performs the traffic measurement method according to any one of the first aspect and the implementations of the first aspect.

According to an eighth aspect, an embodiment of this application provides a network controller, including one or more processors and one or more memories. The one or more memories are coupled to the one or more processors. The one or more memories are configured to store computer program code, and the computer program code includes a computer instruction. When the one or more processors execute the computer instruction, the network controller performs the traffic measurement method according to any one of the second aspect and the implementations of the second aspect.

According to a ninth aspect, an embodiment of this application provides a computer-readable storage medium, including an instruction, and when the instruction runs on a packet processing device, the packet processing device performs the traffic measurement method according to any one of the first aspect and the implementations of the first aspect.

According to a tenth aspect, an embodiment of this application provides a computer-readable storage medium, including an instruction, and when the instruction runs on a network controller, the network controller performs the traffic measurement method according to any one of the second aspect and the implementations of the second aspect.

According to an eleventh aspect, an embodiment of this application provides a computer program product including an instruction, and when the product runs on a packet processing device, the packet processing device performs the traffic measurement method according to any one of the first aspect and the implementations of the first aspect.

According to a twelfth aspect, an embodiment of this application provides a computer program product including an instruction, and when the product runs on a network controller, the network controller performs the traffic measurement method according to any one of the second aspect and the implementations of the second aspect.

According to a thirteenth aspect, an embodiment of this application provides a system, where the system includes a network controller and at least one packet processing device, the packet processing device is configured to perform the traffic measurement method according to any one of the first aspect and the implementations of the first aspect, and the network controller is configured to perform the traffic measurement method according to any one of the second aspect and the implementations of the second aspect.

For beneficial effects of the third aspect to the thirteenth aspect, refer to corresponding descriptions in the first aspect and the second aspect. Details are not described herein again.

DESCRIPTION OF EMBODIMENTS

For ease of understanding, descriptions of some concepts related to the embodiments of this application are given as examples for reference. Details are shown below.

A local area network is a computer group formed by interconnecting a plurality of computers in an area.

A packet transmit-end device is a device that generates and sends a packet.

A Packet forwarding device is a device that receives a packet sent by one device and forwards the packet to another device.

A packet receive-end device is a destination-end receive device of a packet.

A queue is a special linear table that allows only a deletion operation at the front (front) of the table and an insertion operation at the rear (rear) of the table.

A software-defined network means that a control plane and a data plane of a network device are separated to flexibly control a network traffic, making the network more intelligent as a pipeline.

The following describes the technical solutions in the embodiments of this application with reference to the accompanying drawings in the embodiments of this application. In the descriptions of the embodiments of this application, unless otherwise specified, "/" means "or". For example, A/B may mean A or B. "And/or" in this specification describes only an association relationship for describing associated objects and represents that three relationships may be included. For example, A and/or B may represent the following three cases: Only A is included, both A and B are included, and only B is included. In addition, in the descriptions of the embodiments of this application, "a plurality of" means two or more.

Figure 1:
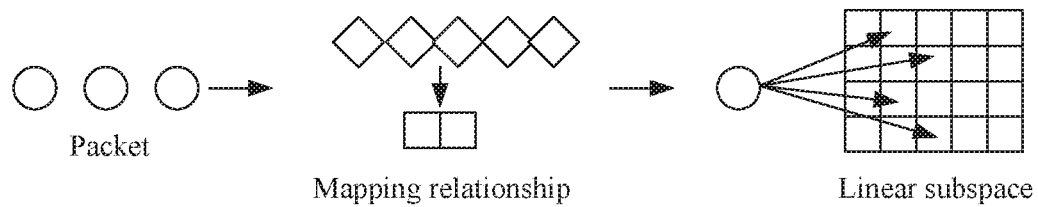
FIG. 1 is a principle diagram of a sketch-based algorithm in the prior art.
Figure 2:
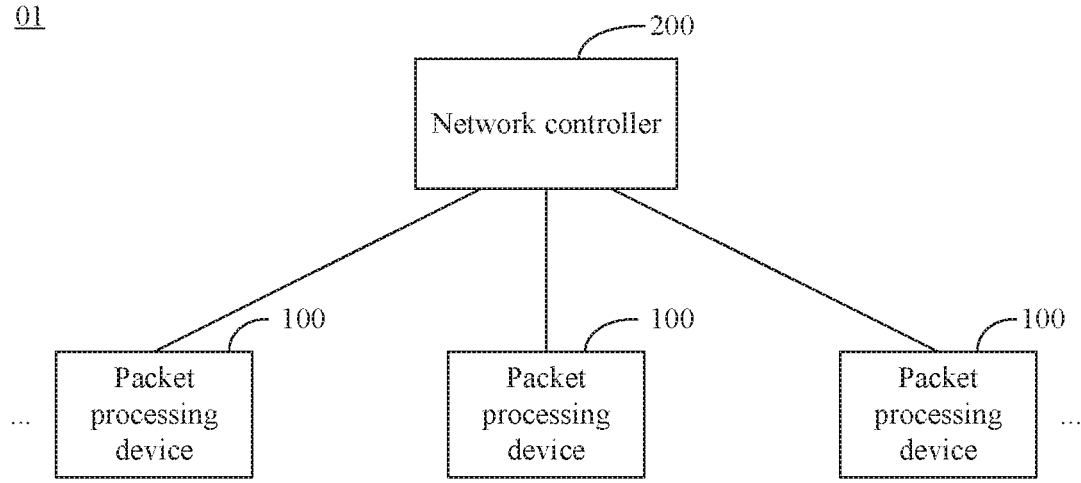
FIG. 2 is a schematic architectural diagram of a network system according to an embodiment of this application.

For a basic schematic architectural diagram of a network system in the embodiments of this application, refer to FIG. 2. The network system 01 may include at least one packet processing device 100 and a network controller 200. For example, the network system 01 may be specifically a local area network (for example, an enterprise network or a campus network) or a data center network, or may be a communications network such as a wide area network. The packet processing device 100 is configured to send, receive, or forward a packet and may be specifically a device such as a host, a router, or a switch. The network controller 200 is configured to control and manage the packet processing device and another device in the network.

Figure 3A:
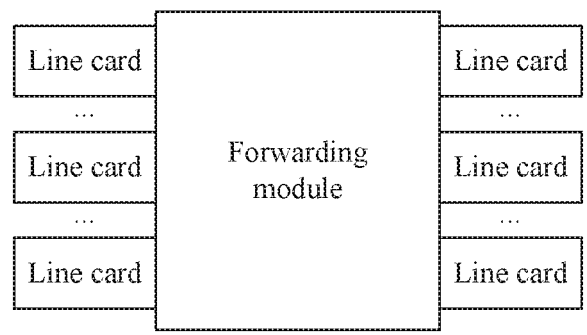
FIG. 3a is a schematic structural diagram of a packet processing device according to an embodiment of this application.

For example, the packet processing device 100 is a switch. FIG. 3a provides a schematic structural diagram of a switch 10. The switch 10 may include a line card and a forwarding module. The line card may be an interface between a network line and the switch. The forwarding module is configured to transmit a packet between line cards.

Figure 3B:
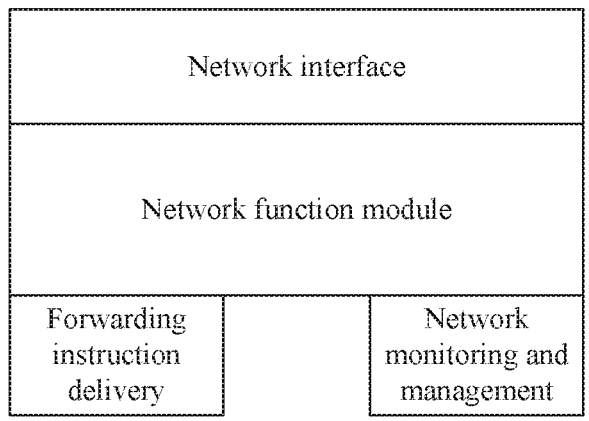
FIG. 3b is a schematic structural diagram of a network controller according to an embodiment of this application.

FIG. 3b provides a schematic structural diagram of a network controller 200. The network controller 200 may include an interface, a network function module, an instruction forwarding module, and a network monitoring and management module. The network interface allows network administrators to deploy and develop network functions, for example, resource management, path calculation, and control policies. The network function module includes various network management and control programs. The forwarding instruction delivery module delivers instructions corresponding to the various management and control programs to a switch and a router that are on a data plane. The network monitoring and management module may be configured to monitor a network status.

Figure 4:
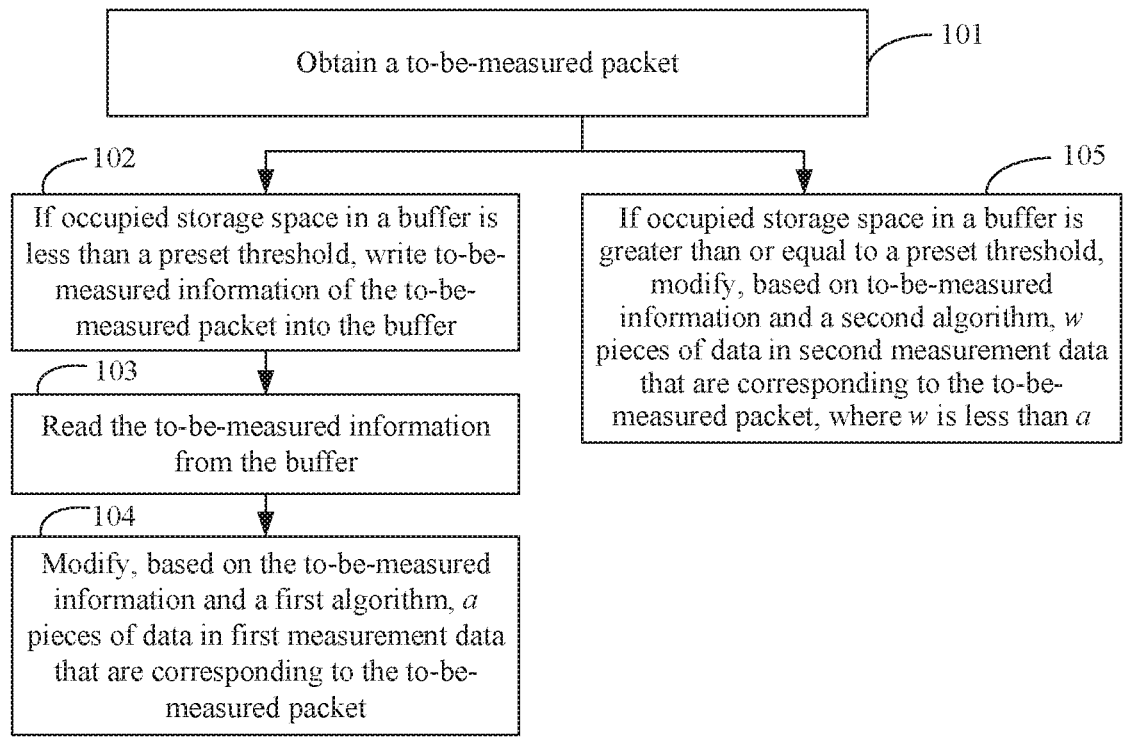
FIG. 4 is a flowchart of a traffic measurement method according to an embodiment of this application.

An embodiment of this application provides a traffic measurement method, and the method relates to the packet processing device and the network controller in the network system shown in FIG. 2. A buffer is disposed in the packet processing device. Referring to FIG. 4, the method may include the following steps.

101. The packet processing device obtains a to-be-measured packet.

The to-be-measured packet is a packet whose traffic volume is to be measured. The traffic volume is a volume of traffic generated during transmission of the packet in a network, and may be specifically a size of the packet, for example, a quantity of bytes of the packet. The packet may include a packet in any form or in any definition, for example, an IP packet, a Media Access Control (media access control, MAC) packet, an Internet Control Message Protocol (internet control message protocol. ICMP) packet, a Transmission Control Protocol (transmission control protocol, TCP) packet, or a User Datagram Protocol (user datagram protocol, UDP) packet.

When packet processing devices are different devices, manners of obtaining the to-be-measured packet by the packet processing devices are also different. For example, when the packet processing device is a packet transmit-end device, the packet processing device may be specifically a host that generates a packet. In this case, the packet processing device may directly obtain a network packet generated by a program on the host. When the packet processing device is a packet receive-end device or a packet forwarding device, that the packet processing device obtains the to-be-measured packet means that the packet processing device receives the to-be-measured packet from another device.

After step 101, proceed to step 102 or step 105 to perform processing, that is, to measure the traffic volume of the to-be-measured packet.

102. If occupied storage space in the buffer is less than a preset threshold, the packet processing device writes to-be-measured information of the to-be-measured packet into the buffer, where the to-be-measured information includes a flow identifier of the to-be-measured packet and a traffic volume of the to-be-measured packet.

The flow identifier is used to identify a data flow corresponding to the to-be-measured packet. Different flow identifiers indicate different data flows of (corresponding to) to-be-measured packets. Each to-be-measured packet may be corresponding to one flow identifier, and each flow identifier may be corresponding to a plurality of to-be-measured packets. Likewise, each to-be-measured packet may be corresponding to one data flow, and each data flow may be corresponding to a plurality of to-be-measured packets.

The to-be-measured information of the to-be-measured packet may include the traffic volume of the to-be-measured packet and the flow identifier corresponding to the to-be-measured packet. For example, the to-be-measured information may be specifically a field that is in the to-be-measured packet and that is used to represent the traffic volume and a field that is in the to-be-measured packet and that is used to represent the flow identifier. Alternatively, the to-be-measured information may be specifically header information of the to-be-measured packet, and the header information includes a field used to represent the traffic volume and a field used to represent the flow identifier. Alternatively, the to-be-measured information may be specifically the to-be-measured packet, and the to-be-measured packet includes a field used to represent the traffic volume and a field used to represent the flow identifier.

The preset threshold may be set according to an actual requirement, for example, may be 90%. After step 101, if the occupied storage space in the buffer is less than the preset threshold, that is, the buffer is not quite full, the packet processing device may write the to-be-measured information of the to-be-measured packet into the buffer, to temporarily store the to-be-measured information of the to-be-measured packet.

For example, the buffer can accommodate to-be-measured information of tens or hundreds of to-be-measured packets. A size of the buffer may be set to an integer multiple of a size of space occupied by the to-be-measured information. For example, when the to-be-measured information is header information of the to-be-measured packet, and a size of the header information is 17 bytes, the size of the buffer may be set to an integer multiple of 17 bytes, for example, may be 1700 bytes. In this way, the buffer can accommodate an integer quantity of complete to-be-measured information.

It should be noted that if a current to-be-measured packet is a to-be-measured packet 1, before to-be-measured information of the to-be-measured packet 1 is written into the buffer, the buffer may be empty or the buffer may have stored to-be-measured information of another to-be-measured packet.

103. The packet processing device reads the to-be-measured information from the buffer.

After writing the to-be-measured information of the to-be-measured packet 1 into the buffer in step 102, the packet processing device may read, from the buffer, the to-be-measured information of the to-be-measured packet 1 that is written into the buffer in step 102.

If the buffer is empty before the to-be-measured information of the to-be-measured packet 1 is written into the buffer, the packet processing device may directly read the to-be-measured information of the to-be-measured packet 1 after writing the to-be-measured information of the to-be-measured packet 1 into the buffer. Alternatively, if the buffer has stored to-be-measured information of another to-be-measured packet before the to-be-measured packet 1 is written into the buffer, after writing the to-be-measured information of the to-be-measured packet 1 into the buffer, the packet processing device may first read the to-be-measured information of the another to-be-measured packet and then read the to-be-measured information of the to-be-measured packet 1.

For example, in an implementation, a data structure in the buffer may be specifically a first in first out queue. In this way, the packet processing device may measure to-be-measured packets in a sequence in which to-be-measured information of the to-be-measured packets is written into the buffer.

104. The packet processing device modifies, based on the to-be-measured information and a first algorithm, a pieces of data in first measurement data that are corresponding to the to-be-measured packet, where a is a positive integer.

The first measurement data is corresponding to the first algorithm. The first measurement data is used to save a traffic volume, of at least one to-be-measured packet, that is measured based on the first algorithm. After the packet processing device reads the to-be-measured information of the to-be-measured packet 1 from the buffer, the packet processing device may modify, based on the first algorithm and a flow identifier and a traffic volume that are in the to-be-measured information of the to-be-measured packet 1, the a pieces of data in the first measurement data that are corresponding to the to-be-measured packet 1.

105. If occupied storage space in the buffer is greater than or equal to a preset threshold, the packet processing device modifies, based on to-be-measured information and a second algorithm, w pieces of data in second measurement data that are corresponding to the to-be-measured packet, where w is a positive integer, and w is less than a.

The second measurement data is corresponding to the second algorithm. The second measurement data is used to save a traffic volume, of at least one to-be-measured packet, that is measured based on the second algorithm. After step 101, if the occupied storage space in the buffer is greater than or equal to the preset threshold, that is, the buffer is relatively full, the packet processing device may modify, based on the second algorithm and a flow identifier and a traffic volume that are in the to-be-measured information of the to-be-measured packet 1, the w pieces of data in the second measurement data that are corresponding to the to-be-measured packet 1.

It should be noted that in this embodiment of this application, w is less than a. To be specific, fewer pieces of data in measurement data that are corresponding to a to-be-measured packet need to be modified when the second algorithm is used to process the to-be-measured packet than when the first algorithm is used. Therefore, processing the to-be-measured packet by using the second algorithm is faster and more efficient, and introduces lower resource overheads. Therefore, in this embodiment of this application, a manner of processing the to-be-measured packet by using the buffer and the first algorithm may be referred to as a slow-channel processing manner, and a manner of processing the to-be-measured packet by using the second algorithm may be referred to as a fast-channel processing manner.

It should be noted that the "processing" in "processing the to-be-measured packet" in this embodiment of this application is collecting or measuring the traffic volume of the to-be-measured packet based on the flow identifier of the to-be-measured packet.

To be specific, in this embodiment of this application, after the to-be-measured packet is obtained, when the buffer is not quite full, the packet processing device may process the to-be-measured packet based on the first algorithm. However, when the buffer is relatively full, it may mean that to-be-measured packets pile up when the to-be-measured packets are processed based on the first algorithm, and consequently a task of processing the to-be-measured packet cannot be completed in a timely manner based on the first algorithm. In this case, the packet processing device may measure the to-be-measured packet based on the faster second algorithm, to prevent a large quantity of to-be-measured packets from piling up because the first algorithm is continuously used to process to-be-measured packets, thereby avoiding excessive overheads of occupied resources, and avoiding affecting a normal packet forwarding service of the packet processing device and affecting a network throughput.

Therefore, according to the traffic measurement method provided in this embodiment of this application, whether the buffer is relatively full is determined to determine whether load of the packet processing device in processing the to-be-measured packet based on the first algorithm is relatively heavy, so that when the load of the packet processing device in processing the to-be-measured packet based on the first algorithm is relatively heavy, the packet processing device switches to process the to-be-measured packet by using the faster second algorithm, thereby ensuring a normal packet forwarding service and improving a network throughput.

Figure 5:
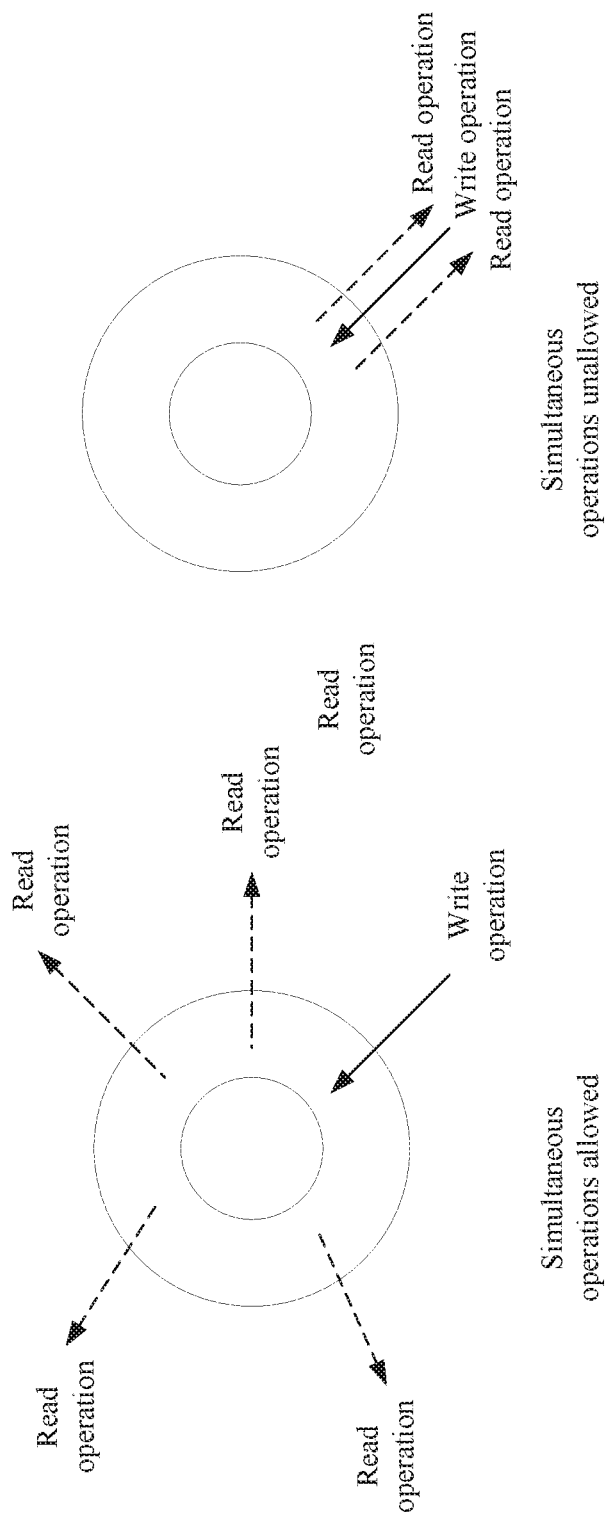
FIG. 5 is a schematic diagram of a lock-free circular queue according to an embodiment of this application.

In this embodiment of this application, referring to FIG. 5, the data structure corresponding to the buffer may be a lock-free circular queue. Readers (writers) record respective read (write) locations. Each time a read (write) operation is completed, the location moves forward by 1 bit. In a buffer in another form, usually, an operation holding a lock can be performed, and an operation holding no lock cannot be performed. An operation cannot be performed until another operation releases a lock. Therefore, a read operation and a write operation usually cannot be simultaneously performed in the buffer. However, in the lock-free circular queue shown in FIG. 5 provided in this embodiment of this application, the read operation and the write operation usually can be simultaneously performed, and the read operation and the write operation cannot be performed simultaneously only when a read location and a write location are relatively close to each other. Therefore, using the lock-free circular queue can make higher processing efficiency.

Figure 6:
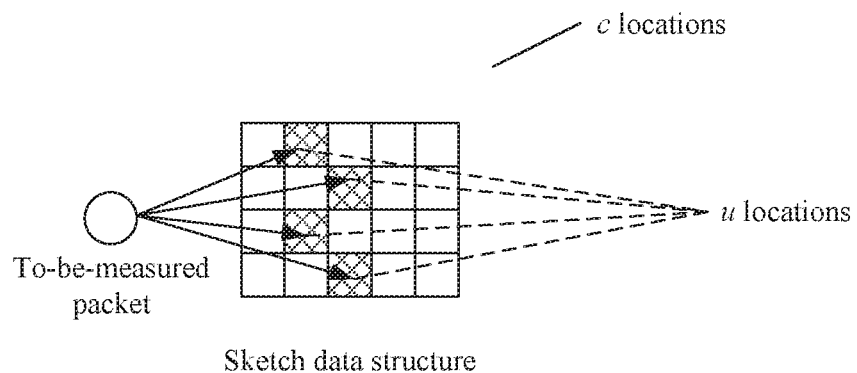
FIG. 6 is a schematic diagram of a mapping relationship according to an embodiment of this application.

In this embodiment of this application, the first algorithm may include a hash function, the first measurement data may include data in c locations, where c is a positive integer. Referring to a mapping relationship shown in FIG. 6, that the packet processing device modifies, based on the to-be-measured information and a first algorithm, a pieces of data in first measurement data that are corresponding to the to-be-measured packet in step 104 may include the following steps:

1041. The packet processing device determines u locations from the c locations based on the flow identifier of the to-be-measured packet and the hash function, where u is a positive integer, and u is less than or equal to c.

1042. The packet processing device modifies a pieces of data in the u locations based on the traffic volume of the to-be-measured packet.

Herein, u is less than or equal to a. To be specific, each of the u locations may be corresponding to at least one of the a pieces of data.

In this embodiment of this application, a specific implementation may be as follows: The a pieces of data in the first measurement data corresponding to the first algorithm in step 104 may be specifically values of a counters, and the w pieces of data in the second measurement data corresponding to the second algorithm in step 105 may be specifically values of w counters. In this case, during processing of a to-be-measured packet, using the first algorithm requires an update to the values of the a counters, and using the second algorithm requires an update to the values of the w counters, where w is less than a.

The first algorithm in this embodiment of this application may be an algorithm having relatively high measurement precision, for example, a sketch-based algorithm. There may be specifically a plurality of types of sketch-based algorithms, for example, a FlowRadar algorithm, a RevSketch algorithm, a UnivMon algorithm, a Deltoid algorithm, a TwoLevel algorithm, an FM algorithm, a kMin algorithm, an LC algorithm, and an MRAC algorithm. In this way, in comparison with the prior art, according to the traffic measurement method provided in this embodiment of this application, when it is determined, by using the buffer, that a task of processing a to-be-measured packet cannot be completed in a timely manner by using the sketch-based algorithm, the to-be-measured packet is processed by using the second algorithm with a higher processing speed, thereby preventing a large quantity of to-be-measured packets from piling up and improving a network throughput.

An example in which the first algorithm is a sketch-based algorithm is used below for description.

When the first algorithm is the sketch-based algorithm, the first measurement data may be corresponding to a sketch data structure. For a schematic diagram of the sketch data structure, refer to FIG. 6. The first measurement data in the sketch data structure may be expressed in a matrix form. In the sketch-based algorithm, the flow identifier of the to-be-measured packet is extracted, calculation is performed on the flow identifier of the to-be-measured packet based on a plurality of hash functions to obtain hash results, a plurality of cells are selected from the matrix, and data in each of the selected cells is updated based on the traffic volume of the to-be-measured packet. In an implementation, each cell in the matrix includes one or more counters. Usually, an initial value of the counter in the cell may be 0 unless modified. In another implementation, each cell in the matrix may be, for example, in a bit data structure or a key-value mapping structure.

When each cell in the matrix includes one or more counters, the a pieces of data modified by the packet processing device in step 104 may be values of a counters corresponding to at least one cell in the matrix, and a is usually greater than or equal to 4.

In addition, in measurement algorithms provided in this embodiment of this application, there may be a plurality of first algorithms deployed in the packet processing device, that is, a plurality of sketch-based algorithms may be simultaneously deployed in the packet processing device, and each sketch-based algorithm is corresponding to one sketch data structure and therefore corresponding to one piece of first measurement data. In step 104, for each sketch-based algorithm, the packet processing device may separately modify a pieces of data in first measurement data corresponding to this sketch-based algorithm. Different sketch-based algorithms may be corresponding to different specific values of a.

Figure 7:
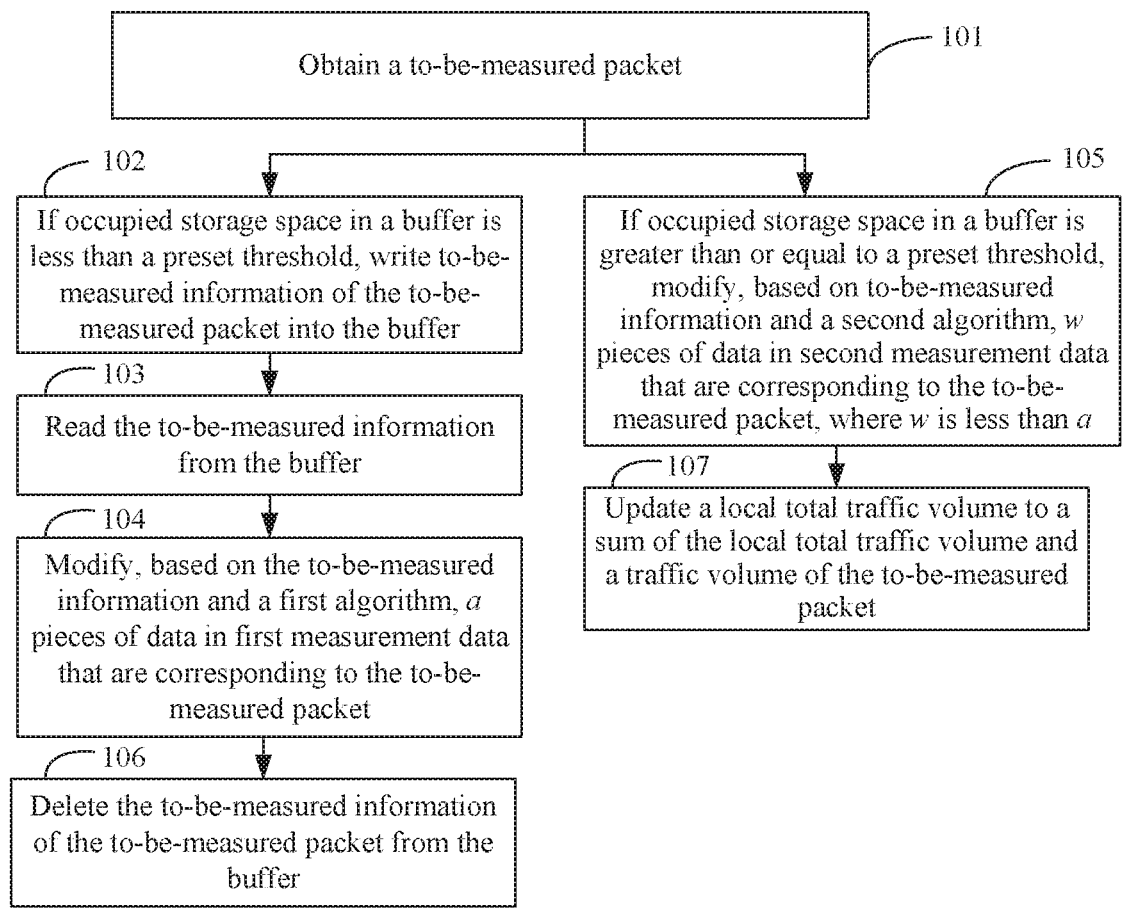
FIG. 7 is a flowchart of another traffic measurement method according to an embodiment of this application.

Further, referring to FIG. 7, after step 104, the traffic measurement method may include the following steps.

106. The packet processing device deletes the to-be-measured information of the to-be-measured packet from the buffer.

After reading the to-be-measured information of the to-be-measured packet, the packet processing device may delete the to-be-measured information of the to-be-measured packet from the buffer, to free up storage space to write to-be-measured information of another newly obtained to-be-measured packet.

In this embodiment of this application, the second measurement data may be corresponding to a flow table, the flow table is stored in the packet processing device, and the second measurement data includes data in the flow table. For example, a data structure corresponding to the flow table may be specifically a hash table or a binary tree. Storage space occupied by the flow table may be relatively small, for example, may be several kilobytes.

In one case, the flow table includes a correspondence between the flow identifier and first data r, that is, includes a correspondence between a data flow corresponding to the flow identifier and the first data r. In step 105, that the packet processing device modifies, based on the to-be-measured information and a second algorithm, w pieces of data in second measurement data that are corresponding to the to-be-measured packet may specifically include the following step:

1051. The packet processing device modifies, based on the to-be-measured information and the second algorithm, first data $r_f$ that is corresponding to the to-be-measured packet and that is in the second measurement data.

In this case, the second measurement data includes the correspondence between the flow identifier and the first data r. The packet processing device may determine, based on the flow identifier of the to-be-measured packet in the to-be-measured information and the second algorithm, first data r corresponding to a flow identifier f of the to-be-measured packet, and modifies the first data r based on the traffic volume of the to-be-measured packet in the to-be-measured information. In this case, w may be 1. To be specific, the packet processing device modifies one piece of data, namely, the first data $r_f$ that is corresponding to the to-be-measured packet and that is in the second measurement data.

The flow table may include a counter, and the first data $r_f$ corresponding to the to-be-measured packet may be specifically a value of the counter. To be specific, the packet processing device may update a value of one counter. In this case, w is 1.

Specifically, step 1051 may include the following step:

1052. When the flow table includes a flow identifier f of the to-be-measured packet, update first data $r_f$ that is corresponding to the to-be-measured packet and that is in the flow table to a sum of the first data $r_f$ corresponding to the to-be-measured packet and the traffic volume of the to-be-measured packet.

When the flow identifier f of the to-be-measured packet already exists in the flow table, and a correspondence between the flow identifier f corresponding to the to-be-measured packet and the first data $r_f$ corresponding to the to-be-measured packet also exists in the flow table, the packet processing device may update the first data $r_f$ corresponding to the to-be-measured packet to the sum of the first data $r_f$ corresponding to the to-be-measured packet and the traffic volume of the to-be-measured packet. Therefore, only one piece of data, namely, the first data $r_f$ corresponding to the to-be-measured packet, is modified during processing of the to-be-measured packet.

In another case, the flow table includes a correspondence between the flow identifier and each of first data r and second data d, that is, includes a correspondence between a data flow corresponding to the flow identifier and each of the first data r and the second data d. When the flow table does not include the flow identifier f of the to-be-measured packet and the flow table is full, the packet processing device may delete, from the flow table, a flow identifier, first data r, and second data d that are corresponding to a data flow having a relatively small traffic volume. Specifically, before step 105, the method may further include the following steps:

201. The packet processing device calculates a decrement value ê.

202. The packet processing device updates first data r corresponding to each flow identifier included in the flow table to a difference between the first data r and the decrement value ê.

203. The packet processing device updates second data d corresponding to each flow identifier included in the flow table to a sum of the second data d and the decrement value ê.

204. The packet processing device deletes a correspondence between a flow identifier meeting a first preset condition and each of the first data r and the second data d.

The flow identifier meeting the first preset condition is a flow identifier whose corresponding updated first data r is less than or equal to 0.

The operations corresponding to steps 201 to 204 may be referred to as deletion operations. The deletion operation causes a loss of some traffic information. In the deletion operation, the packet processing device may delete a flow identifier, first data r, and second data d that are corresponding to a data flow whose corresponding first data r is less than the decrement value e. In other words, the packet processing device may delete, from the flow table, some data flows whose first data r is relatively small, so that the flow table can save a flow identifier corresponding to a data flow whose first data r is relatively large.

Further, the flow table may include a correspondence between the flow identifier and each of the first data r, the second data d, and third data e. When the flow table does not include the flow identifier f of the to-be-measured packet and the flow table is full, based on steps 201 to 204, step 105 may specifically include the following steps:

1053. If the traffic volume of the to-be-measured packet is greater than the decrement value ê, the packet processing device sets a difference between the traffic volume of the to-be-measured packet and the decrement value ê to first data $r_f$ corresponding to the to-be-measured packet.

1054. The packet processing device sets the decrement value ê to second data $d_f$ corresponding to the to-be-measured packet.

1055. The packet processing device sets a total decrement traffic volume E to third data $e_f$ corresponding to the to-be-measured packet.

1056. The packet processing device inserts, into the flow table, a correspondence between the flow identifier f of the to-be-measured packet and each of the first data $r_f$ corresponding to the to-be-measured packet, the second data $d_f$ corresponding to the to-be-measured packet, and the third data $e_f$ corresponding to the to-be-measured packet.

When the traffic volume of the to-be-measured packet is greater than the decrement value ê, it may indicate that a traffic volume of a data flow of the to-be-measured packet is relatively large, and a flow identifier, first data r, and second data d that are corresponding to the data flow may be saved in the flow table. Therefore, the correspondence between the flow identifier f of the to-be-measured packet and each of the first data $r_f$ corresponding to the to-be-measured packet, the second data $d_f$ corresponding to the to-be-measured packet, and the third data $e_f$ corresponding to the to-be-measured packet may be inserted into the flow table.

In this case, the packet processing device may modify the first data $r_f$, the second data $d_f$, and the third data $e_f$ that are corresponding to the to-be-measured packet in step 105, that is, need to modify w=3 pieces of data.

In this embodiment of this application, the first data r may be understood as a remaining traffic volume of a corresponding data flow after the deletion operation. When the deletion operation is performed zero times, the first data r may be the traffic volume of the to-be-measured packet, and the flow identifier of the data flow corresponding to the to-be-measured packet is corresponding to the first data r. The second data d may be understood as a lost traffic volume of the corresponding data flow during the deletion operation. The third data e may be understood as an estimated value of a maximum traffic loss before the corresponding flow identifier is inserted into the flow table this time.

In step 1055, the packet processing device sets the total decrement traffic volume E to the third data $e_f$ corresponding to the to-be-measured packet. To be specific, during insertion of the flow identifier f into the flow table, the estimated value of the maximum traffic loss before the flow identifier f is inserted into the flow table this time is the total decrement traffic volume E.

After steps 201 to 204 and step 1056, the method may further include the following step:

205. The packet processing device updates the total decrement traffic volume E to a sum of the total decrement traffic volume E and the decrement value ê.

After performing the deletion operation, the packet processing device may further add the decrement value ê to the total decrement traffic volume E, so that during insertion of a flow identifier into the flow table next time, third data ê corresponding to the flow identifier may be set to the total decrement traffic volume E. The total decrement traffic volume E may be specifically a value of a counter.

To be specific, the total decrement traffic volume E is a sum of decrement values ê that are lost each time the packet processing device performs the deletion operation. During insertion of the flow identifier f into the flow table, the estimated value of the maximum traffic loss before the flow identifier f is inserted into the flow table this time is a sum of decrement values ê that are lost each time the packet processing device performs the deletion operation.

In step 201, that the packet processing device calculates a decrement value ê may include the following steps:

2011. The packet processing device sorts the traffic volume of the to-be-measured packet and the first data r corresponding to the flow identifiers included in the flow table in order of values, and denotes the first two values after sorting as $R_1$ and $R_2$ and a last value after sorting as $R_k$.

2012. The packet processing device calculates the decrement value ê based on $R_1$, $R_2$, $R_k$, and the following expression:

$$\hat{e} = \sqrt[\theta]{1 - \delta R_k}, \text{ where } \theta = \log_b \frac{1}{2}, b = \frac{R_1 - 1}{R_2 - 1},$$

and δ represents a constant.

A main principle of steps 2011 and 2012 is to obtain a long tail distribution by fitting values of all first data r in the flow table, and delete, by selecting a threshold (that is, the decrement value ê), a long tail part from the distribution obtained through fitting.

In another case, when the flow table does not include the flow identifier f of the to-be-measured packet and the flow table is not full, in step 105, that the packet processing device modifies, based on the to-be-measured information and a second algorithm, w pieces of data in second measurement data that are corresponding to the to-be-measured packet may include the following steps:

1057. The packet processing device sets the traffic volume of the to-be-measured packet to first data $r_f$ corresponding to the to-be-measured packet.

1058. The packet processing device sets a total decrement traffic volume E to third data $e_f$ corresponding to the to-be-measured packet.

1059. The packet processing device inserts, into the flow table, a correspondence between the flow identifier f of the to-be-measured packet and each of the first data $r_f$ corresponding to the to-be-measured packet and the third data et corresponding to the to-be-measured packet.

In this case, the packet processing device may modify two pieces of data, namely, the first data $r_f$ and the third data $e_f$ that are corresponding to the to-be-measured packet, that is, w=2. In addition, the packet processing device inserts, into the flow table, the correspondence between the flow identifier f of the to-be-measured packet and each of the first data $r_f$ corresponding to the to-be-measured packet and the third data $e_f$ corresponding to the to-be-measured packet.

Figure 8:
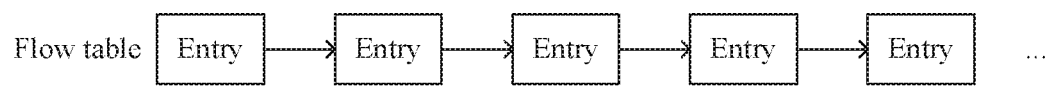
FIG. 8 is a schematic diagram of a flow table according to an embodiment of this application.

In addition, in this embodiment of this application, referring to FIG. 8, the flow table may specifically include an entry, and the entry may include a correspondence between the flow identifier and each of the first data r, the second data d, and the third data e. In addition, the first data r, the second data d, and the third data e in the entry may be specifically respectively values of three counters. To be specific, for each to-be-measured packet, the packet processing device may modify, based on the second algorithm, a value (r) of one counter, values (e and r) of two counters, or values (e, r, and d) of three counters. Usually, an initial value of a counter in the flow table may be set to 0.

Figure 9:
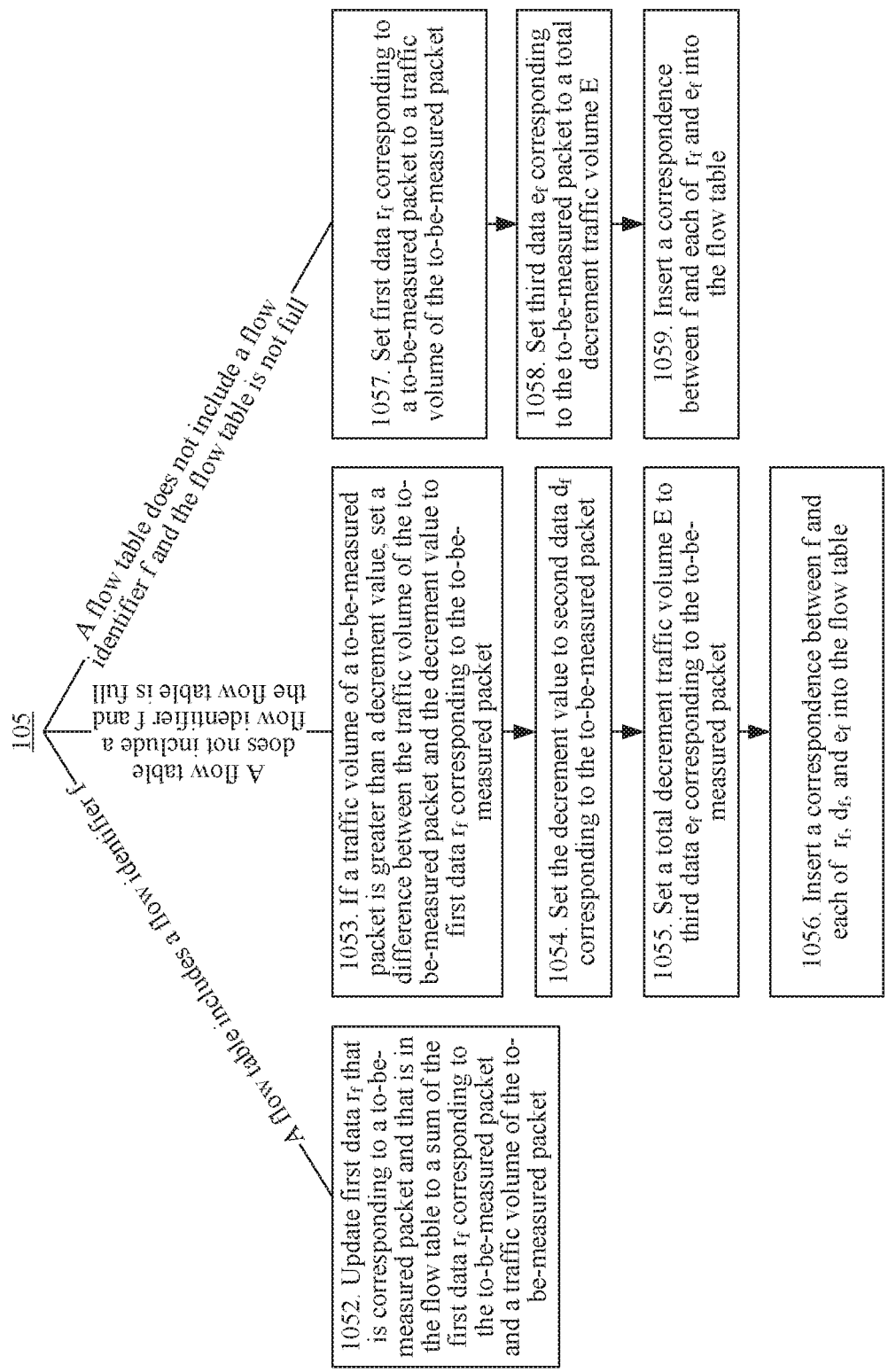
FIG. 9 is a flowchart of a modification process according to an embodiment of this application.

For a specific implementation process of step 105, refer to FIG. 9.

Further, the second measurement data may include a local total traffic volume. If the occupied storage space in the buffer is greater than or equal to the preset threshold, referring to FIG. 7, the method may further include the following step:

107. The packet processing device updates the local total traffic volume to a sum of the local total traffic volume and the traffic volume of the to-be-measured packet.

In this embodiment of this application, the packet processing device may add an obtained traffic volume of each to-be-measured packet to the local total traffic volume. To be specific, the local total traffic volume may be understood as a traffic volume that needs to be measured based on the second algorithm, that is, a total volume of traffic entering a fast channel. Specifically, the local total traffic volume may also be a value of a counter.

There is no specific sequence relationship between step 107 and step 105. That is, step 107 may be before step 105 after step 105.

It should be noted that content of the second algorithm provided in the foregoing embodiment of this application may specifically include corresponding content in step 105, steps 1051 to 1059, steps 201 to 205, steps 2011 and 2012, and step 107.

Figure 10:
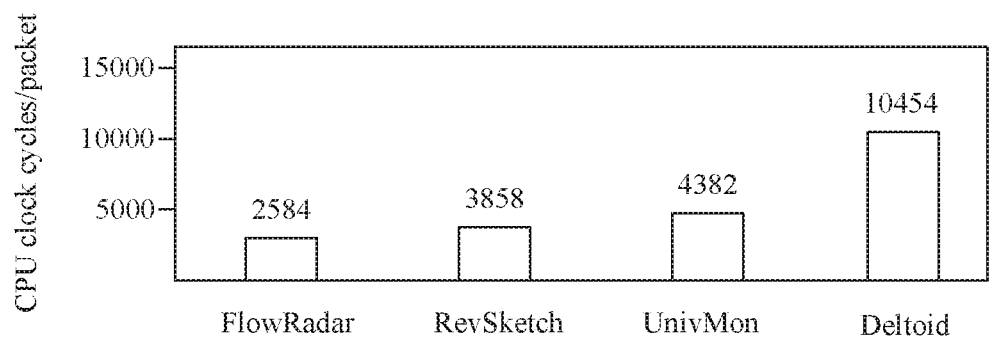
FIG. 10 is a diagram of a correspondence between a sketch-based algorithm and a quantity of CPU clock cycles according to an embodiment of this application.

In addition, experimental data shows that when a prior-art measurement method is used, corresponding central processing unit (central processing unit, CPU) clock cycles used when each packet is processed by four sketch-based algorithms, namely, a FlowRadar algorithm, a RevSketch algorithm, a UnivMon algorithm, and a Deltoid algorithm, may be shown in FIG. 10. It can be learned from FIG. 10 that processing one packet by using the sketch-based algorithm is corresponding to thousands or even tens of thousands of CPU clock cycles. However, by using the second algorithm provided in this embodiment of this application, only tens of CPU clock cycles are required to process one packet. It can be learned that processing efficiency of the second algorithm provided in this application is higher. In this embodiment of this application, switching is performed between the sketch-based algorithm and the second algorithm, thereby reducing resource overheads and improving overall processing efficiency of the packet processing device.

In this embodiment of this application, the flow identifier that is used to identify a data flow and that is corresponding to the to-be-measured packet may be in a plurality of specific forms. For example, the flow identifier may be a 5-tuple, and the 5-tuple includes a source Internet Protocol IP address, a source port, a destination IP address, a destination port, and a transport layer protocol. Alternatively, the flow identifier is a 2-tuple, and the 2-tuple includes a source IP address and a destination IP address. Alternatively, when the to-be-measured packet is an IP packet, the flow identifier may be the first three characters in a TOS field. Alternatively, when the to-be-measured packet is a multi-protocol label switching (multi-protocol label switching, MPLS) packet, the flow identifier may be an EXP field. Alternatively, the flow identifier may include an Ethernet source address and an Ethernet destination address.

Figure 11:
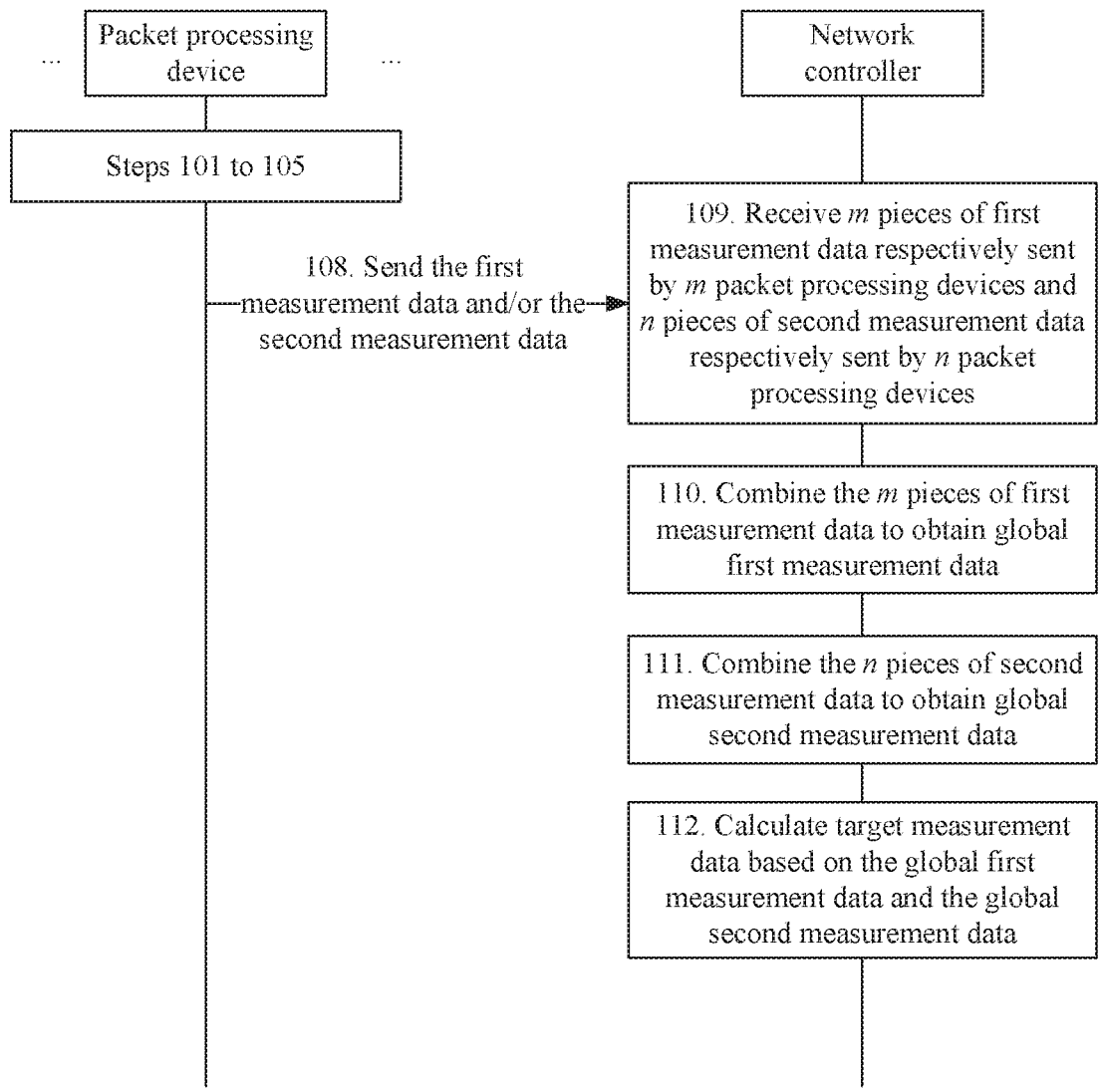
FIG. 11 is a flowchart of another traffic measurement method according to an embodiment of this application.

Further, after step 105, referring to FIG. 11, the traffic measurement method provided in this embodiment of this application may further include the following steps.

108. The packet processing device sends the first measurement data and/or the second measurement data to a network controller, where the first measurement data and/or the second measurement data are/is used by the network controller to calculate target measurement data.

The packet processing device may report the first measurement data and/or the second measurement data to the network controller, so that the network controller can calculate the target measurement data based on the first measurement data and/or the second measurement data, to collect statistics about traffic, perform network management, and so on.

Specifically, in a possible implementation, step 108 may include the following step:

1081. The packet processing device sends the first measurement data and/or the second measurement data to the network controller based on a preset period.

In this implementation, when a report period arrives, the packet processing device may report the obtained first measurement data and/or second measurement data to the network controller.

In another possible implementation, step 108 may include the following steps:

1082. The packet processing device receives a measurement data request message sent by the network controller.

1083. The packet processing device sends the first measurement data and/or the second measurement data to the network controller in response to the measurement data request message.

In this implementation, the packet processing device may report the obtained first measurement data and/or second measurement data to the network controller after receiving the measurement data request message sent by the network controller.

Specifically, the first measurement data is corresponding to the first algorithm and a slow channel, and the second measurement data is corresponding to the second algorithm and a fast channel. If the packet processing device processes the to-be-measured packet based on only the first algorithm after measurement data is reported last time, the packet processing device reports only the first measurement data. If the packet processing device processes the to-be-measured packet based on only the second algorithm after measurement data is reported last time, the packet processing device reports only the second measurement data. If the packet processing device processes the to-be-measured packet based on the first algorithm and the second algorithm after measurement data is reported last time, the packet processing device reports both the first measurement data and the second measurement data. In other words, the packet processing device may report at least one of the first measurement data and the second measurement data at each time of reporting.

Further, after step 108, the packet processing device may further delete the first measurement data and/or the second measurement data that have/has been reported this time. For example, when the first measurement data is data in a matrix corresponding to a sketch data structure and the second measurement data is data in the flow table, and a matrix cell and the flow table each include one or more counters, after periodically reporting the first measurement data and/or the second measurement data, the packet processing device may further reset, to initial values, values of the counters in the matrix cell and the flow table and a value of a counter corresponding to the local total traffic volume, for example, reset all the values to 0, so as to delete the first measurement data and/or the second measurement data. In addition, a value of a counter of the total decrement traffic volume E may also be reset to an initial value.

Alternatively, after step 108, the packet processing device may not delete the first measurement data and/or the second measurement data, but record the first measurement data and/or the second measurement data reported this time, so that at a next time of reporting, the packet processing device can obtain actual traffic values during two reporting periods based on new first measurement data and/or second measurement data and the first measurement data and/or the second measurement data reported this time. Alternatively, the network controller may obtain actual traffic values during two reporting periods based on first measurement data and/or second measurement data reported by the packet processing device two times.

It should be noted that the foregoing process is described by using one packet processing device in the architecture shown in FIG. 2 as an example. A processing process of another packet processing device in the architecture shown in FIG. 2 is similar to the foregoing process. That is, a plurality of packet processing devices each can send the first measurement data and/or the second measurement data to the network controller.

Corresponding to reporting processes of the plurality of packet processing devices, the network controller may receive the first measurement data and/or the second measurement data sent by the plurality of packet processing devices. This may specifically include the following steps.

109. The network controller receives m pieces of first measurement data respectively sent by m packet processing devices and n pieces of second measurement data respectively sent by n packet processing devices, where the first measurement data is obtained based on the first algorithm, the second measurement data is obtained based on the second algorithm, and both m and n are non-negative integers.

Herein, the m packet processing devices and the n packet processing devices are packet processing devices in the architecture shown in FIG. 2, and the m packet processing devices and the n packet processing devices may be different packet processing devices, or may be same packet processing devices, or may partially overlap. For example, the m packet processing devices herein may be a packet processing device 1 and a packet processing device 2, and the n packet processing devices herein may be a packet processing device 3 and a packet processing device 4. For another example, the m packet processing devices herein may be a packet processing device 1 and a packet processing device 2, and the n packet processing devices herein may be the packet processing device 2, a packet processing device 3, and a packet processing device 4. For another example, herein, m=n, and both the m packet processing devices and the n packet processing devices are a packet processing device 1, a packet processing device 2, a packet processing device 3, and a packet processing device 4.

Each packet processing device in the architecture shown in FIG. 2 may report at least one of the first measurement data and the second measurement data to the network controller, because during two reporting periods, the packet processing device may process the to-be-measured packet based on only the first algorithm to update the first measurement data, or process the to-be-measured packet based on only the second algorithm to update the second measurement data, or updates both the first measurement data and the second measurement data based on the first algorithm and the second algorithm.

To be specific, all packet processing device in the architecture shown in FIG. 2 can report the first measurement data and the second measurement data to the network controller; or some packet processing devices in the architecture shown in FIG. 2 can report the first measurement data to the network controller, and some packet processing devices in the architecture shown in FIG. 2 can report the second measurement data to the network controller. When all the packet processing devices in the architecture shown in FIG. 2 report only the first measurement data to the network controller, n may be 0. When all the packet processing devices in the architecture shown in FIG. 2 report only the second measurement data to the network controller, m may be 0.

110. The network controller combines the m pieces of first measurement data to obtain global first measurement data.

After receiving the m pieces of first measurement data reported by the m packet processing devices, the network controller may combine the m pieces of first measurement data to obtain total first measurement data, referred to as global first measurement data.

111. The network controller combines the n pieces of second measurement data to obtain global second measurement data.

After receiving the n pieces of second measurement data reported by the n packet processing devices, the network controller may combine the n pieces of second measurement data to obtain total second measurement data, referred to as global second measurement data.

112. The network controller calculates target measurement data based on the global first measurement data and the global second measurement data.

After obtaining the global first measurement data and the global second measurement data, the network controller may calculate the target measurement data based on the global first measurement data and the global second measurement data.

In this way, the network controller can comprehensively collect statistics about traffic data in a network, namely, the target measurement data, based on the first measurement data and the second measurement data reported by the packet processing device.

The target measurement data calculated in step 112 may have a same data structure as the global first measurement data. To be specific, the target measurement data obtained by the network controller, the first measurement data obtained based on the first algorithm, and the global first measurement data have a same data structure. It can be understood as that the network controller converts the global second measurement data obtained based on the second algorithm into a form of the global first measurement data, to recover traffic information that is lost in a deletion operation of the second algorithm, so that the target measurement data obtained based on the global first measurement data and the global second measurement data can have measurement precision equivalent to that corresponding to the first algorithm.

Therefore, in the measurement method provided in this embodiment of this application, when load of processing the to-be-measured packet based on the first algorithm is relatively heavy, switching to processing based on the second algorithm with a higher processing speed may be performed by using the buffer, thereby improving a network throughput. In addition, the target measurement data obtained based on the first algorithm and the second algorithm may have a same data structure as the first measurement data obtained based on the first algorithm, thereby maintaining relatively high measurement precision equivalent to that corresponding to the first algorithm.

For example, the first algorithm is a sketch-based algorithm, the first measurement data is a sketch data structure, and the second measurement data is a hash table structure. In this case, the global first measurement data is also a sketch data structure, the global second measurement data is also a hash table structure, and the target measurement data obtained through calculation is a sketch data structure.

Specifically, corresponding to the sending manner in steps 1081 to 1083, step 109 may specifically include the following step:

1091. The network controller periodically receives the m pieces of first measurement data respectively sent by the m packet processing devices and the n pieces of second measurement data respectively sent by the n packet processing devices.

Alternatively, in another implementation, before step 109, the method may further include the following step.

1092. The network controller sends a measurement data request message to each packet processing device.

In step 1092, the network controller may actually send the measurement data request message to each packet processing device in the architecture shown in FIG. 2. When the architecture shown in FIG. 2 includes A packet processing devices, A is less than or equal to a sum of m and n.

In this embodiment of this application, if each piece of first measurement data includes p rows and q columns of elements, step 110 may specifically include the following steps.

1100. The network controller combines each m elements that are of the m pieces of first measurement data and that are in corresponding locations, to obtain the global first measurement data, where the global first measurement data includes p rows and q columns of elements.

The global first measurement data has a same data structure and a same quantity of elements as each of the m pieces of first measurement data. The network controller merely adds m elements that are of m pieces of first measurement data that are corresponding to each of p×q locations, to obtain the global first measurement data. The p rows and q columns of elements may be understood as a p×q matrix, and the combination process may be understood as matrix addition. It should be noted that an element herein is corresponding to a location, and an element corresponding to each location may specifically include one or more pieces of data. For example, when a data structure of the first measurement data is the sketch data structure shown in FIG. 6, the first measurement data may be represented as a 4×5 matrix, data in each cell may be referred to one element, and each cell may include a plurality of pieces of data.

In this embodiment of this application, each piece of second measurement data includes a local total traffic volume and a flow table. If the flow table includes at least one entry, and the entry is in a one-to-one correspondence with a flow identifier, step 111 may specifically include the following steps:

1111. The network controller adds n local total traffic volumes in the n pieces of second measurement data to obtain a global total traffic volume.

1112. The network controller combines entries of n flow tables corresponding to the n pieces of second measurement data, to obtain a global flow table, where in the global flow table, the flow identifier is in a one-to-one correspondence with the entry.

1113. The global total traffic volume and the global flow table obtained by the network controller are the global second measurement data.

In step 1112, the entry may specifically include a flow identifier and traffic data corresponding to the flow identifier, and the combining entries of n flow tables corresponding to the n pieces of second measurement data includes the following steps:

301. In the entries of the n flow tables corresponding to the n pieces of second measurement data, for a plurality of entries having a same flow identifier, the network controller adds traffic data in the plurality of entries to combine the plurality of entries into one entry of the global flow table.

302. The network controller uses each of entries having different flow identifiers as one entry of the global flow table.

For example, referring to the following Table 1, if a flow table 1 includes an entry 1 and an entry 2, the entry 1 is corresponding to a flow identifier 1, and the entry 2 is corresponding to a flow identifier 2: and a flow table 2 includes an entry 3 and an entry 4, the entry 3 is corresponding to the flow identifier 2, and the entry 4 is corresponding to a flow identifier 3, the entry 2 and the entry 3 are corresponding to the same flow identifier 2. Therefore, in a combined global flow table, the entry 2 and the entry 3 are combined into one entry, and the entry 1 and the entry 4 each are one entry of the global flow table.

TABLE 1

| Before combination | | | | After combination | | |
|---|---|---|---|---|---|---|
| Flow table | Entry | Flow identifier | Traffic data | Flow table | Entry | Flow identifier | Traffic data |
| Flow table 1 | Entry 1 | Flow identifier 1 | Data 1 | Global flow table | Entry 1 | Flow identifier 1 | Data 1 |
| | Entry 2 | Flow identifier 2 | Data 2 | | Entry 20 | Flow identifier 2 | Data 2 + data 3 |
| Flow table 2 | Entry 3 | Flow identifier 2 | Data 3 | | Entry 4 | Flow identifier 3 | Data 4 |
| | Entry 4 | Flow identifier 3 | Data 4 | | | | |

It should be noted that this embodiment of this application is described by using an example in which only one first algorithm is deployed in the packet processing device. When a plurality of first algorithms are deployed in the packet processing device, each first algorithm is corresponding to one piece of first measurement data and therefore corresponding to one piece of global first measurement data. Therefore, the network controller may obtain a plurality of pieces of global first measurement data based on the plurality of first algorithms, and may combine each of the plurality of pieces of global first measurement data with the global second measurement data to obtain a plurality of pieces of target measurement data.

In this embodiment of this application, after obtaining the global first measurement data and the global second measurement data, the network controller may obtain, by constructing a compressed sensing-based optimization problem, target measurement data having a same data structure as the first measurement data. Specifically, step 112 may include the following steps:

1121. The network controller constructs an optimization target function based on the global first measurement data and the global second measurement data.

1122. The network controller calculates the target measurement data based on a convex optimization algorithm and the optimization target function.

An expression of the optimization target function is: minimize $$\left( \alpha |T|_* + \beta |x|_1 + \frac{1}{2\gamma} |y|_F^2 \right);$$

and the optimization target function meets the following constraints:

constraint 1: $T = N + sk(x+y)$;
constraint 2: $|x|_1 |y|_1 = V$; and
constraint 3: $\forall s \in H$, $r_s + d_s \leq x_s \leq r_s + d_s + e_s$, where "minimize" represents calculation of an independent variable value that minimizes the optimization target function, T represents the target measurement data. N represents the global flow table, V represents the global total traffic volume, H represents the global first measurement data, x represents a traffic volume of a data flow corresponding to a flow identifier included in H, $x_s$ represents a traffic volume of a data flow corresponding to a flow identifier s, y represents a traffic volume that is of a data flow not included in H and that is in a traffic volume, of a data flow: measured based on the second algorithm x+y represents the traffic volume, of the data flow, measured based on the second algorithm, sk(x+y) represents a result obtained by using x+y as input and by invoking the first algorithm; $r_s$ represents first data r corresponding to the flow identifier s, $d_s$ represents second data d corresponding to the flow identifier s, and $e_s$ represents third data e corresponding to the flow identifier s, and $|T|_+$ represents a nuclear norm of T and is defined as a sum of all singular values of a matrix, $|x|_1$ represents an $L_1$ norm of a vector x and is defined as a sum of absolute values of all data in x, and $|y|_F^2$ represents a Frobenius norm of a vector y and is defined as a sum of squares of all the data in x, where calculation expressions of α, β, and γ are respectively:

$$\alpha=(\sqrt{P_N}+\sqrt{Q_N})\sqrt{\eta(N)}, \text{ and}$$

$$\beta=\sqrt{2\log(m_x;n_x)}; \text{ and}$$

$$\gamma=10\sigma_y, \text{ where}$$

$P_N$ and $Q_N$ respectively represent a length and a width of a matrix N, η(N) represents an average of data in N, $m_x$ and $n_x$ respectively represent a length and a width of the vector x, and $\sigma_y$ represents a standard deviation of all data in y.

Herein, x and y may be represented as vectors, and an $i^{th}$ piece of data of the vector is a traffic volume of a flow identifier i. If the flow identifier i is not in x or y, the $i^{th}$ piece of data x[i] or y[i] is 0. For example, when a flow identifier is a 5-tuple, there are a total of $2^{104}$ different 5-tuple possibilities, the global flow table N has a total of $2^{104}$ pieces of data, values of $m_x$ and $n_x$ are respectively $2^{104}$ and 1, and both x and y are a 5-tuple vector with a length of $2^{104}$.

Herein, there are a plurality of convex optimization algorithms. For example, the convex optimization algorithm may be an interior-point method, an alternating direction method of multipliers ADMM, or a subgradient method.

There is no close-form solution for a general convex optimization problem, that is, an expression of a function relationship between output and input cannot be explicitly given. Therefore, in steps 1121 and 1122, an approximation method may be used to find an approximate local optimal solution through search within a particular range based on a constraint rule, to substitute for an expected global optimal solution.

sk(x+y) represents the result obtained by using x+y as input and by invoking the first algorithm. Therefore, sk(x+y) has a same data structure as the global first measurement data N obtained based on the first algorithm, and sk(x+y), N, and a sum of the two, that is, the target measurement function, also have a same data structure. In this way, the calculated target measurement data is characterized by high precision equivalent to that of the first algorithm.

After the target measurement data is obtained, the target measurement data may be used for at least one of network exception detection, network traffic distribution statistics, network tomography, distributed denial of service (distributed denial of service, DDoS) attack detection, and the like. For different first algorithms, functions of the calculated target measurement data may also be different. For example, when the first algorithm is Deltoid, RevSketch, or FlowRadar, the calculated target measurement data may be used for elephant flow detection; when the first algorithm is TwoLevel, the calculated target measurement data may be used for DDoS detection; when the first algorithm is LC, kMin. or FM, the calculated target measurement data may be used for flow quantity statistics; and so on.

Further, in this embodiment of this application, the flow identifier of the to-be-measured packet obtained in step 101 may be a target flow identifier. In other words, the to-be-measured packet is a packet with the target flow identifier. If the packet processing device receives a plurality of packets, a packet with the target flow identifier is the to-be-measured packet, and traffic of a packet without the target flow identifier is not measured. Therefore, referring to FIG. 12, before step 101, the method may further include the following steps:

113. The network controller sends an instruction message to each packet processing device, where the instruction message carries a target flow identifier corresponding to the to-be-measured packet processing device.

114. The packet processing device receives the instruction message sent by the network controller, where the instruction message includes the target flow identifier.

To be specific, the network controller may send the target flow identifier to specify that the packet processing device measures and reports a traffic volume of a packet corresponding to the target flow identifier.

In addition, the network controller may pre-configure a correspondence between the packet processing device and the target flow identifier by using a configuration policy, so that a traffic volume of one packet in the network is measured and reported by only one packet processing device in the network instead of being measured and reported by a plurality of packet processing devices. Therefore, packets measured by packet processing devices in the network do not overlap each other, thereby avoiding repeated measurement and achieving accurate network traffic measurement.

For example, that the to-be-measured packet processing device is corresponding to the target flow identifier may include the following: the to-be-measured packet processing device is a last-hop device of a data flow corresponding to the target flow identifier; or the to-be-measured packet processing device is a first-hop device of a data flow corresponding to the target flow identifier: or the to-be-measured packet processing device is a receive-end device of a data flow corresponding to the target flow identifier; or the to-be-measured packet processing device is a transmit-end device of a data flow corresponding to the target flow identifier. Certainly, there is also another correspondence between the packet processing device and the target flow identifier, and details are not described herein.

In addition, in a specific implementation of this embodiment of this application, the network system shown in FIG. 2 may be an SDN network, the network controller may be an SDN controller in the SDN network, and the packet processing device may be a device, in the SDN network, disposed with an SDN software switch.

In addition, it should be noted that the foregoing embodiment of this application is mainly described by using an example in which the second algorithm is a flow table-based algorithm, referred to as a first flow table algorithm herein. In another implementation of this embodiment of this application, the second algorithm may alternatively be a second flow table algorithm, namely, a MisraGries algorithm. A main principle of the second flow table algorithm is to record flow identifiers into one flow table, and each entry has only one counter to represent a current traffic volume. When the flow table is full, an entry with a smallest traffic volume is deleted. In comparison with the first flow table algorithm provided in this embodiment of this application, in the second flow table algorithm, because only one entry is deleted each time, a quantity of deletions is excessive large, requiring a large quantity of resources and impacting algorithm efficiency. In addition, because each flow table entry has only one counter, an error caused by a deletion operation cannot be recorded, and consequently a final result has a relatively low precision.

Figure 13:
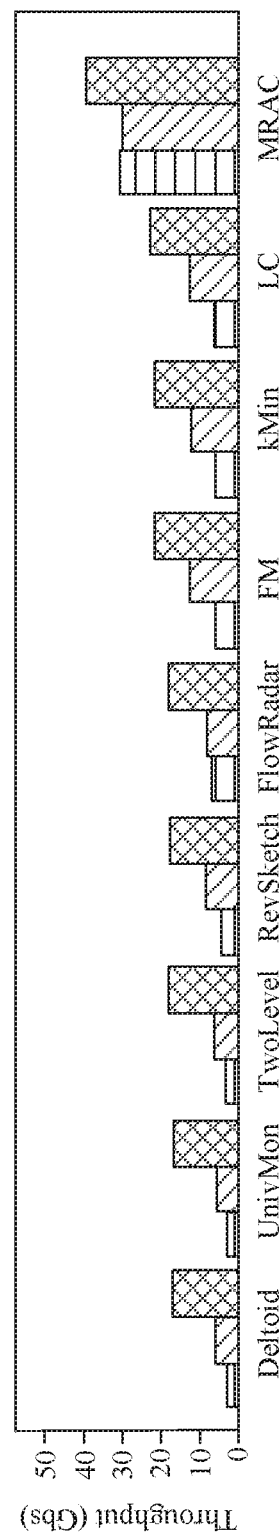
FIG. 13 is a diagram of a correspondence between a traffic measurement method and a network throughput according to an embodiment of this application.

Herein, a traffic measurement method based only on the sketch-based algorithm in the prior art is referred to as Method 1, a measurement method in which the sketch-based algorithm is used as the first algorithm and the second flow table algorithm is used as the second algorithm is referred to as Method 2, and a measurement method in which the sketch-based algorithm is used as the first algorithm and the first flow table algorithm is used as the second algorithm is referred to as Method 3. In this case, when sketch-based algorithms Deltoid, UnivMon. TwoLevel, RevSketch, Flow-Radar, FM, kMin, LC, and MRAC are separately used, network throughputs that are obtained through experiments and that are respectively corresponding to Method 1, Method 2, and Method 3 are shown in FIG. 13. In FIG. 13, parts filled with vertical lines are corresponding to Method 1, parts filled with forward slashes are corresponding to Method 2, and parts filled with grids are corresponding to Method 3. Experimental data in FIG. 13 can show that a higher network throughput can be reached by using Method 3.

In addition, in step 112, steps 1121 and 1122 provide a specific implementation for solving the target measurement function T by using the convex optimization algorithm. In another implementation of step 112, the network controller may solve the target measurement function T through simple calculation instead of the convex optimization algorithm, to reduce processing complexity. For example, T=N+sk(x), where N represents the global flow table, x represents a traffic volume of a data flow corresponding to a flow identifier included in H, and sk(x) represents a result obtained by using x as input and by invoking the first algorithm. In a specific implementation, a traffic volume of a data flow corresponding to each flow identifier in x may be a sum of first data r and second data d that are corresponding to the flow identifier. In another specific implementation, a traffic volume of a data flow corresponding to each flow identifier in x may be a sum of first data r, second data d, and third data e that are corresponding to the flow identifier. Experimental data shows that when the algorithm for calculating the target measurement function provided in steps 1121 and 1122 is used, better performance can be achieved.

Figure 14A:
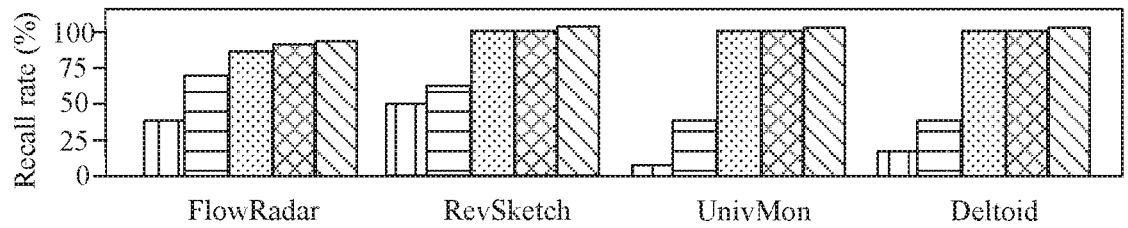
FIG. 14a is a diagram of a correspondence between a traffic measurement method and a recall rate according to an embodiment of this application.
Figure 14B:
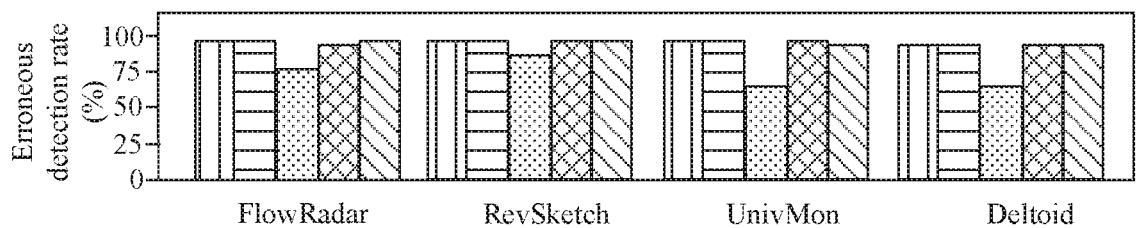
FIG. 14b is a diagram of a correspondence between a traffic measurement method and an erroneous detection rate according to an embodiment of this application.
Figure 14C:
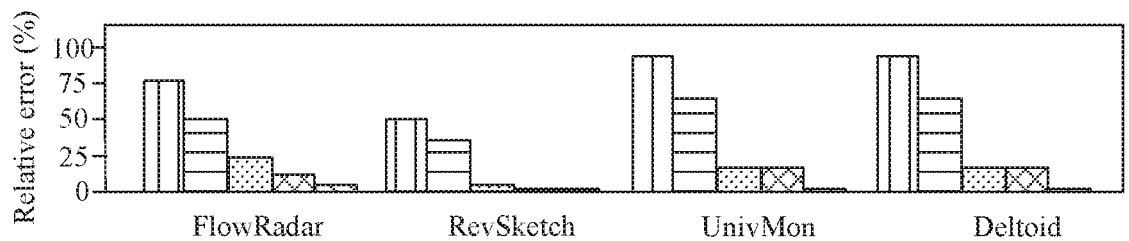
FIG. 14c is a diagram of a correspondence between a traffic measurement method and a relative error according to an embodiment of this application.
Figure 14D:
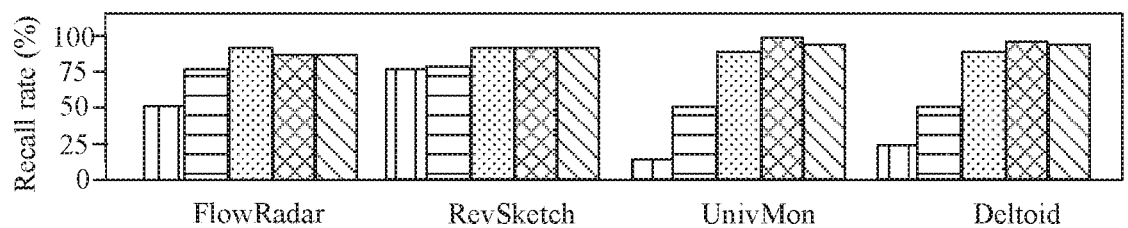
FIG. 14d is a diagram of a correspondence between another traffic measurement method and a recall rate according to an embodiment of this application.
Figure 14E:
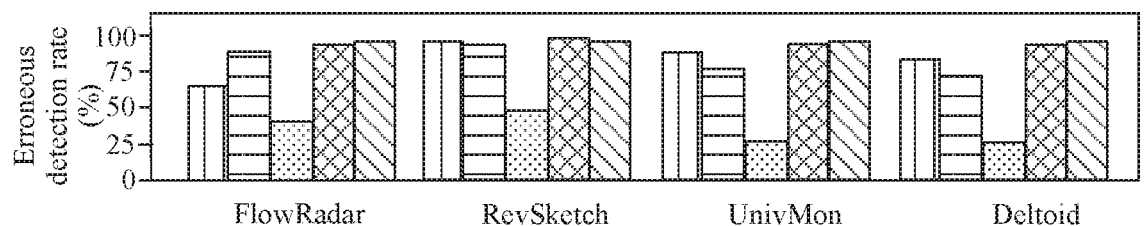
FIG. 14e is a diagram of a correspondence between another traffic measurement method and an erroneous detection rate according to an embodiment of this application.
Figure 14F:
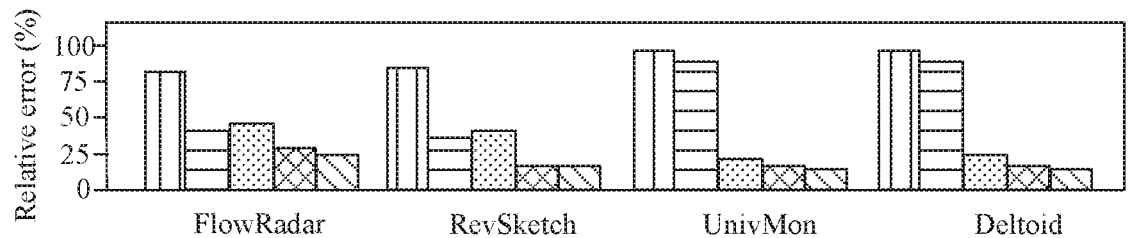
FIG. 14f is a diagram of a correspondence between another traffic measurement method and a relative error according to an embodiment of this application.

For example, precision of network exception detection is used as an example for description. It is assumed that the traffic measurement method based only on the sketch-based algorithm in the prior art is referred to as Method A; that a corresponding traffic measurement method in which the sketch-based algorithm is used as the first algorithm, the first flow table algorithm is used as the second algorithm, the target measurement function is calculated based on the expression T=N+sk(x), and x is a sum of r and d is referred to as Method B; that a corresponding traffic measurement method in which the sketch-based algorithm is used as the first algorithm, the first flow table algorithm is used as the second algorithm, the target measurement function is calculated based on the expression 7'=N+sk(x), and x is a sum of r, d, and e is referred to as Method C: and that a traffic measurement method in which the sketch-based algorithm is used as the first algorithm, the first flow table algorithm is used as the second algorithm, and the target measurement function is calculated by using the foregoing convex optimization algorithm is referred as Method D. In this case, when sketch-based algorithms FlowRadar. RevSketch, UnivMon, and Deltoid are separately used to detect network exception based on a heavy hitter flow or a heavy changer flow, cases of Method A to Method D and ideal precision in terms of recall (recall) rate, erroneous detection rate (precision), and relative error (relative error) are shown in FIG. 14a to FIG. 14f. In FIG. 14a to FIG. 14f, parts filled with vertical lines are corresponding to Method A, parts filled with horizontal lines are corresponding to Method B, parts filled with dots are corresponding to Method C, parts filled with grids are corresponding to Method D, and parts filled with backslashes represent ideal precision values. In addition, FIG. 14a to FIG. 14c are corresponding to heavy hitter flows, and FIG. 14d to FIG. 14f are corresponding to heavy changer flows. It can be learned from FIG. 14a to FIG. 14f that detection precision corresponding to Method D is higher and closer to the ideal precision value.

The foregoing mainly describes the solutions provided in the embodiments of this application from a perspective of interaction between network elements. It can be understood that to implement the foregoing functions, each network element, for example, the packet processing device or the network controller, includes corresponding hardware structures and/or software modules for performing the functions. A person skilled in the art should be easily aware that the algorithm steps in the examples described with reference to the embodiments disclosed in this specification can be implemented by using hardware or a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the packet processing device and the network controller may be divided into function modules based on the foregoing method examples. For example, function modules may be obtained through division for each function, or two or more functions may be integrated into one processing module. The integrated module may be implemented in a form of hardware, or may be implemented in a form of a software function module. It should be noted that the module division in the embodiments of this application is an example, and is merely logical function division and may be other division in actual implementation.

Figure 15:
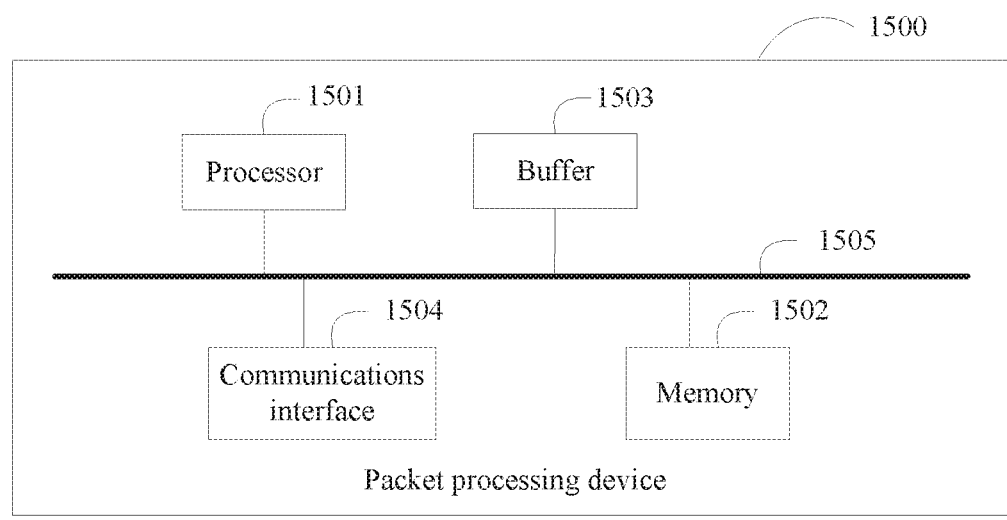
FIG. 15 is a schematic structural diagram of another packet processing device according to an embodiment of this application.

An embodiment of this application further provides a packet processing device 1500. Referring to FIG. 15, the packet processing device 1500 includes at least one processor 1501, a memory 1502, a buffer 1503, a communications interface 1504, and a bus 1505, and the at least one processor 1501, the memory 1502, and the buffer 1503 are connected to each other by using the bus 1505. The communications interface 1504 is configured to obtain a to-be-measured packet when the packet processing device 1500 is a packet forwarding device or a packet receive-end device. The memory 1502 is configured to store an instruction. The processor 1501 is configured to invoke the instruction stored in the memory 1502 to implement the following operations: obtaining a to-be-measured packet when the packet processing device 1500 is a packet transmit-end device: and if occupied storage space in the buffer 1503 is less than a preset threshold, writing to-be-measured information of the to-be-measured packet into the buffer 1503, where the to-be-measured information includes a flow identifier of the to-be-measured packet and a traffic volume of the to-be-measured packet, reading the to-be-measured information from the buffer 1503, and modifying, based on the to-be-measured information and a first algorithm, a pieces of data in first measurement data that are corresponding to the to-be-measured packet, where a is a positive integer; or if occupied storage space in the buffer 1503 is greater than or equal to a preset threshold, modifying, based on to-be-measured information and a second algorithm, w pieces of data in second measurement data that are corresponding to the to-be-measured packet, where w is a positive integer, and w is less than a. The buffer 1503 is configured to store the to-be-measured information after the processor 1501 writes the to-be-measured information of the to-be-measured packet into the buffer 1503.

It should be noted that the buffer 1503 and the memory 1502 herein may be two independent hardware modules, or may be integrated to be one hardware module.

The processor 1501 may be configured to support the packet processing device 1500 in performing steps 101 to 105 in FIG. 4, FIG. 7, and FIG. 11, steps 106 and 107 in FIG. 7, and steps 1052 and 1059 in FIG. 9. The communications interface 1504 is configured to support the packet processing device 1500 in performing step 101 in FIG. 4 and FIG. 7 (when the packet processing device 1500 is a packet forwarding device or a packet receive-end device), step 108 in FIG. 11, and step 114 in FIG. 12. In addition, the components in FIG. 15 may be further configured to support the packet processing device 1500 in performing another process of the technology described in this specification.

Figure 16:
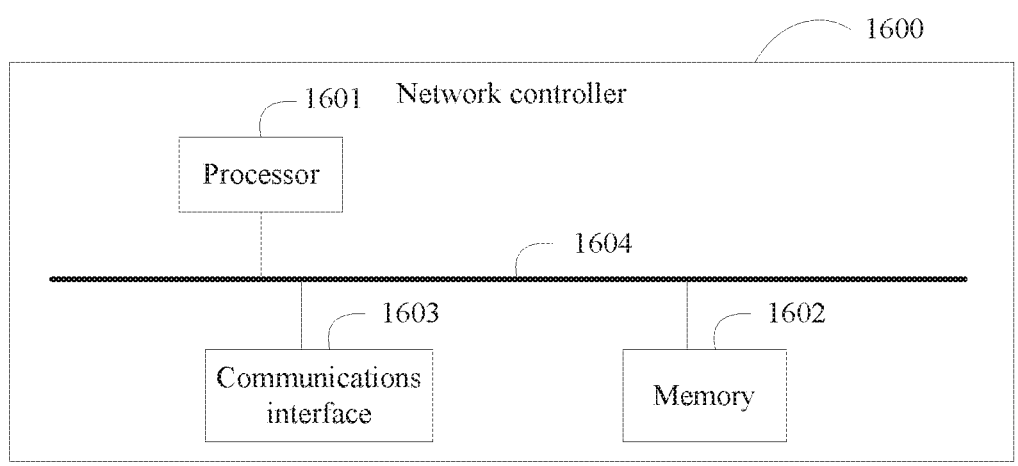
FIG. 16 is a schematic structural diagram of another network controller according to an embodiment of this application.

An embodiment of this application further provides a network controller 1600. Referring to FIG. 16, the network controller 1600 may include at least one processor 1601, a memory 1602, a communications interface 1603, and a bus 1604, and the at least one processor 1601 and the memory 1602 are connected to each other by using the bus 1604. The communications interface 1603 is configured to receive m pieces of first measurement data respectively sent by m packet processing devices and n pieces of second measurement data respectively sent by n packet processing devices, where the first measurement data is obtained based on a first algorithm, the second measurement data is obtained based on a second algorithm, and both m and n are non-negative integers. The memory 1602 is configured to store an instruction. The processor 1601 is configured to invoke the instruction stored in the memory 1602 to implement the following operations: combining the m pieces of first measurement data to obtain global first measurement data: combining the n pieces of second measurement data to obtain global second measurement data: and calculating target measurement data based on the global first measurement data and the global second measurement data.

Figure 12:
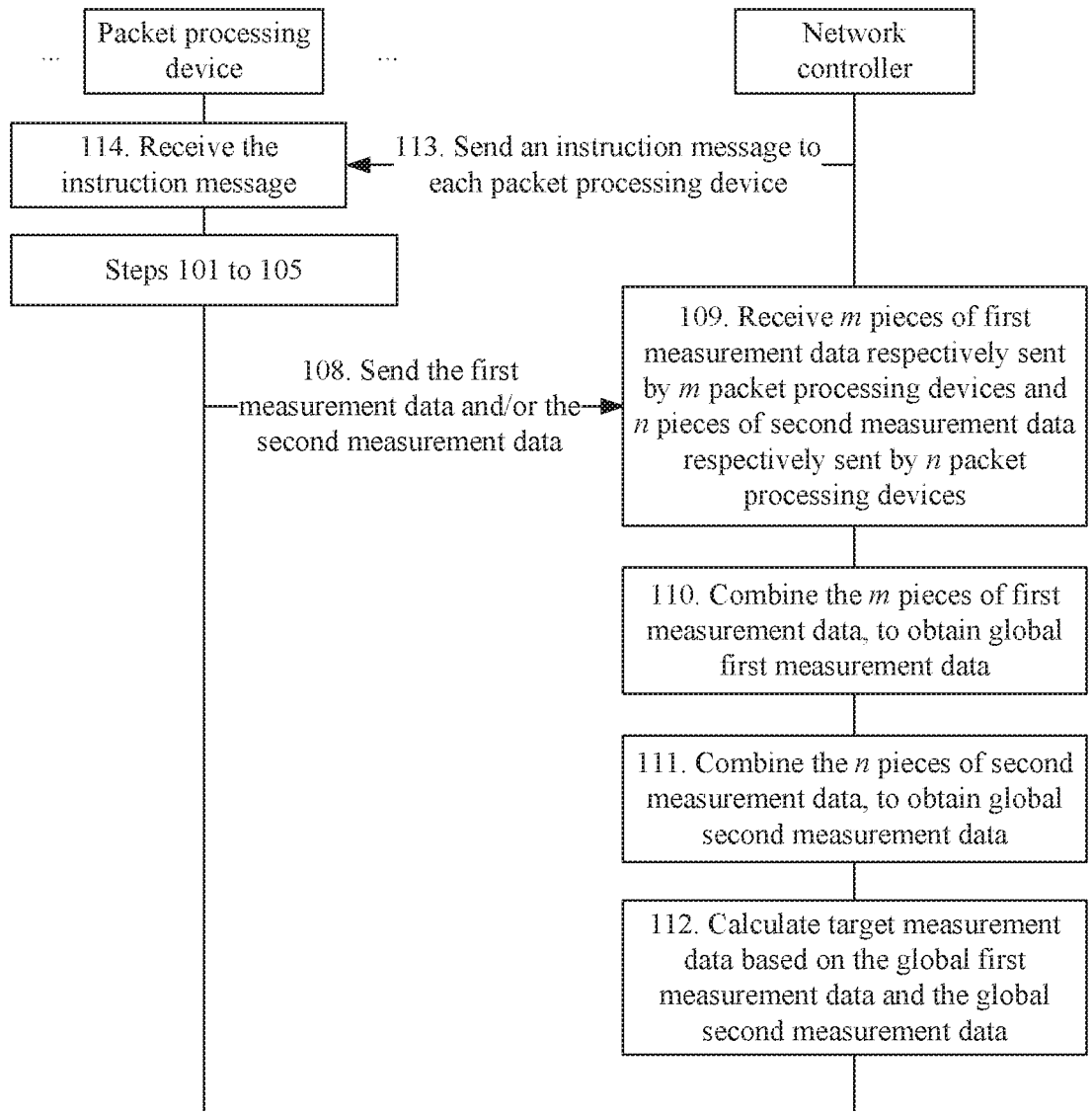
FIG. 12 is a flowchart of another traffic measurement method according to an embodiment of this application.

The processor 1601 may be configured to support the network controller 1600 in performing steps 110 to 112 in FIG. 11 and FIG. 12. The communications interface 1603 is configured to support the network controller 1600 in performing step 109 in FIG. 11 and FIG. 12 and step 113 in FIG. 12. In addition, the components in FIG. 16 may be further configured to support the network controller 1600 in performing another process of the technology described in this specification.

The processors in FIG. 15 and FIG. 16 each may include different types of processors or include a same type of processor, and may be specifically any one of the following devices with a computational processing capability: a central processing unit CPU, an ARM processor, a field programmable gate array (field programmable gate array, FPGA), and a dedicated processor. The processor may alternatively be integrated as a many-core processor.

The memories in FIG. 15 and FIG. 16 each may be any one or any combination of the following storage media: a random access memory (random access memory, RAM), a read-only memory (read only memory, ROM), a nonvolatile memory (non-volatile memory, NVM), a solid state drive (solid state drives, SSD), a mechanical hard disk, a magnetic disk, a disk array, and the like.

The communications interfaces in FIG. 15 and FIG. 16 each is configured to exchange data with another device. The communications interface may be any one or any combination of the following devices with a network access function: a network interface (for example, an Ethernet interface), a wireless network interface card, and the like.

The buses in FIG. 15 and FIG. 16 each may include an address bus, a data bus, a control bus, and the like. For ease of representation, a thick line is used in FIG. 10 to represent the bus. The bus may be any one or any combination of the following devices used for wired data transmission: an industry standard architecture (industry standard architecture, ISA) bus, a peripheral component interconnect (peripheral component interconnect, PCI) bus, an extended industry standard architecture (extended industry standard architecture, EISA) bus, and the like.

Figure 17:
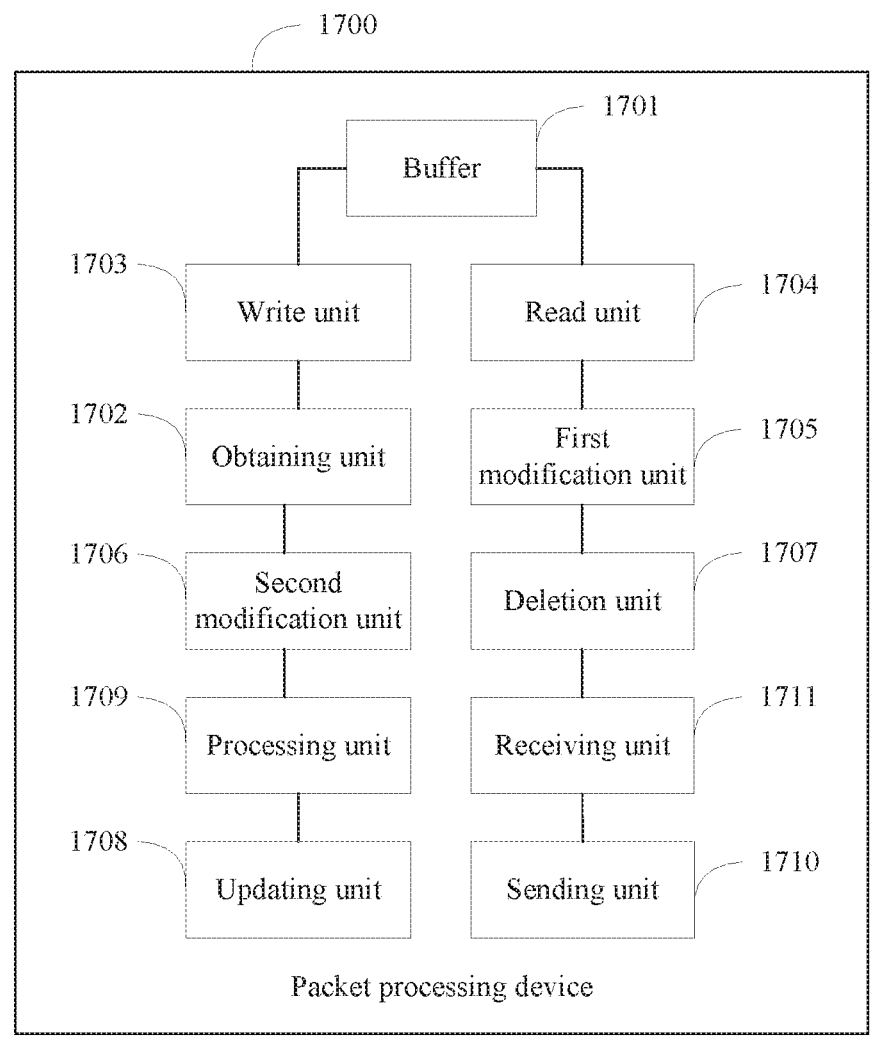
FIG. 17 is a schematic structural diagram of another packet processing device according to an embodiment of this application.

An embodiment of this application further provides a packet processing device 1700. Referring to FIG. 17, the packet processing device 1700 may include a buffer 1701, an obtaining unit 1702, a write unit 1703, a read unit 1704, a first modification unit 1705, a second modification unit 1706, a deletion unit 1707, an updating unit 1708, a processing unit 1709, a sending unit 1710, and a receiving unit 1711. The obtaining unit 1702 is configured to obtain a to-be-measured packet. The write unit 1703 is configured to: if occupied storage space in the buffer is less than a preset threshold, write to-be-measured information of the to-be-measured packet into the buffer, where the to-be-measured information includes a flow identifier of the to-be-measured packet and a traffic volume of the to-be-measured packet. The buffer 1701 is configured to store the to-be-measured information after the write unit 1703 writes the to-be-measured information into the buffer 1701. The read unit 1704 is configured to read the to-be-measured information from the buffer 1701. The first modification unit 1705 is configured to modify, based on the to-be-measured information and a first algorithm, a pieces of data in first measurement data that are corresponding to the to-be-measured packet, where a is a positive integer. The second modification unit 1706 is configured to: if occupied storage space in the buffer 1701 is greater than or equal to a preset threshold, modify, based on to-be-measured information and a second algorithm, w pieces of data in second measurement data that are corresponding to the to-be-measured packet, where w is a positive integer, and w is less than a.

The sending unit 1710 and the receiving unit 1711 may be corresponding to functions of the communications interface 1504 shown in FIG. 15. The write unit 1703, the read unit 1704, the first modification unit 1705, the second modification unit 1706, the deletion unit 1707, the processing unit 1709, and the updating unit 1708 may be corresponding to functions of the processor 1501. The obtaining unit 1702 may be corresponding to some functions of the communications interface 1504 or the processor 1501 shown in FIG. 15. Details are not described herein again.

Figure 18:
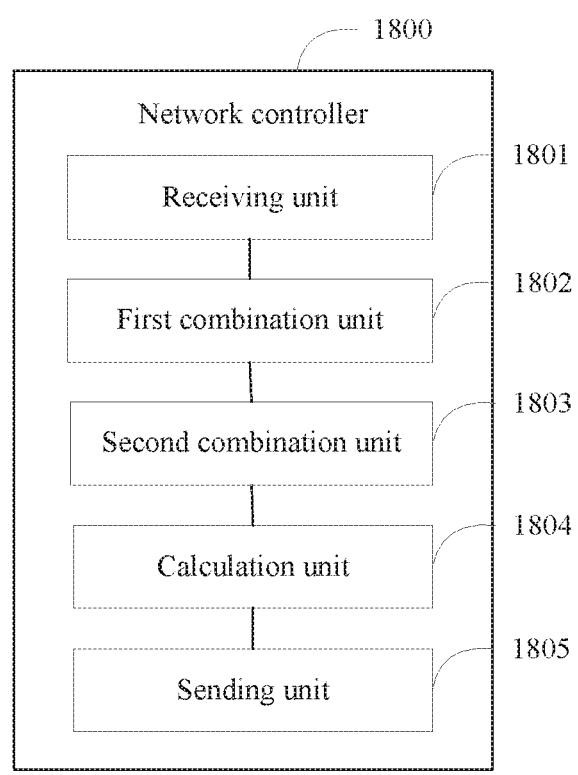
FIG. 18 is a schematic structural diagram of another network controller according to an embodiment of this application.

An embodiment of this application further provides a network controller 1800. Referring to FIG. 18, the network controller 1800 may include a receiving unit 1801, a first combination unit 1802, a second combination unit 1803, a calculation unit 1804, and a sending unit 1805. The receiving unit 1801 is configured to receive m pieces of first measurement data respectively sent by m packet processing devices and n pieces of second measurement data respectively sent by n packet processing devices, where the first measurement data is obtained based on a first algorithm, the second measurement data is obtained based on a second algorithm, and both m and n are non-negative integers. The first combination unit 1802 is configured to combine the m pieces of first measurement data to obtain global first measurement data. The second combination unit 1803 is configured to combine the n pieces of second measurement data to obtain global second measurement data. The calculation unit 1804 is configured to calculate target measurement data based on the global first measurement data and the global second measurement data.

The sending unit 1805 and the receiving unit 1801 may be corresponding to functions of the communications interface 1603 shown in FIG. 16. The first combination unit 1802, the second combination unit 1803, and the calculation unit 1804 may be corresponding to functions of the processor 1601 shown in FIG. 16. Details are not described herein again.

It should be noted that all related content of the steps in the foregoing method embodiments may be cited in function descriptions of the corresponding function modules. Details are not described herein again.

Through the foregoing descriptions of implementations, a person skilled in the art can clearly know that for the purpose of convenient and brief description, division of the foregoing function modules is merely used as an example for illustration. In actual application, the foregoing functions can be allocated to different function modules and implemented according to a requirement, that is, an inner structure of an apparatus is divided into different function modules to implement all or some of the functions described above.

An embodiment of this application further provides a computer storage medium, configured to store a computer software instruction for use by the foregoing packet processing device. When the instruction runs on the packet processing device, the packet processing device performs the traffic measurement method in the foregoing embodiment. For example, the storage medium may be specifically the foregoing memory.

An embodiment of this application further provides a computer storage medium, configured to store a computer software instruction for use by the foregoing network controller. When the instruction runs on the network controller, the network controller performs the traffic measurement method in the foregoing embodiment.

An embodiment of this application further provides a computer program product including an instruction, and when the product runs on the foregoing packet processing device, the packet processing device performs the traffic measurement method in the foregoing embodiment.

An embodiment of this application further provides a computer program product including an instruction, and when the product runs on the foregoing network controller, the network controller performs the traffic measurement method in the foregoing embodiment.

An embodiment of this application further provides a system. For a basic architecture of the system, refer to FIG. 2. The system may include a network controller and at least one packet processing device. The network controller and the packet processing device in the system may perform the traffic measurement method provided in the foregoing embodiment of this application.

The packet processing device may be configured to: obtain a to-be-measured packet; and if occupied storage space in a buffer is less than a preset threshold, write to-be-measured information of the to-be-measured packet into the buffer, where the to-be-measured information includes a flow identifier of the to-be-measured packet and a traffic volume of the to-be-measured packet, read the to-be-measured information from the buffer, and modify, based on the to-be-measured information and a first algorithm, a pieces of data in first measurement data that are corresponding to the to-be-measured packet, where a is a positive integer: or if occupied storage space in a buffer is greater than or equal to a preset threshold, modify, based on to-be-measured information and a second algorithm, w pieces of data in second measurement data that are corresponding to the to-be-measured packet, where w is a positive integer, and w is less than a.

The network controller may be configured to: receive m pieces of first measurement data respectively sent by m packet processing devices and n pieces of second measurement data respectively sent by n packet processing devices, where the first measurement data is obtained based on a first algorithm, the second measurement data is obtained based on a second algorithm, and both m and n are non-negative integers; combine the m pieces of first measurement data to obtain global first measurement data; combine the n pieces of second measurement data to obtain global second measurement data: and calculate target measurement data based on the global first measurement data and the global second measurement data.

In one division manner of the system, the system may include a control plane and a data plane. The at least one packet processing device may be corresponding to functions of the data plane, and the network controller may be corresponding to functions of the control plane.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)) or the like.

Although this application is described with reference to the embodiments, in a process of implementing this application that claims protection, a person skilled in the art may understand and implement other variations of the disclosed embodiments by viewing the accompanying drawings, disclosed content, and the accompanying claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A traffic measurement method, applied to a packet processing device, wherein the packet processing device comprises a buffer, and wherein the method comprises:
    obtaining a to-be-measured packet;
    in response to determining that occupied storage space in the buffer is less than a preset threshold:
        writing to-be-measured information of the to-be-measured packet into the buffer, wherein the to-be-measured information comprises a flow identifier of the to-be-measured packet and a traffic volume of the to-be-measured packet;
        reading the to-be-measured information from the buffer; and
        modifying, based on the to-be-measured information and a first algorithm, a pieces of data in first measurement data corresponding to the to-be-measured packet, wherein a is a positive integer; and
    in response to determining that occupied storage space in the buffer is greater than or equal to the preset threshold, modifying, based on the to-be-measured information and a second algorithm, w pieces of data in second measurement data corresponding to the to-be-measured packet, wherein w is a positive integer, and wherein w is less than a.

2. The traffic measurement method according to claim 1, wherein the a pieces of data include values of a counters, and wherein the w pieces of data include values of w counters.

3. The traffic measurement method according to claim 1, wherein the first algorithm comprises a hash function, wherein the first measurement data comprises data in c locations, wherein c is a positive integer, and wherein the modifying, based on the to-be-measured information and a first algorithm, a pieces of data in first measurement data corresponding to the to-be-measured packet comprises:
    determining u locations from the c locations based on the flow identifier of the to-be-measured packet and the hash function, wherein u is a positive integer, and wherein u is less than or equal to c; and
    modifying a pieces of data in the u locations based on the traffic volume of the to-be-measured packet, wherein u is less than or equal to a.

4. The traffic measurement method according to claim 1, wherein a flow table is stored in the packet processing device, wherein the second measurement data comprises data in the flow table, wherein the flow table comprises a correspondence between the flow identifier and first data r, and wherein the modifying, based on the to-be-measured information and a second algorithm, w pieces of data in second measurement data corresponding to the to-be-measured packet comprises:
    modifying, based on the to-be-measured information and the second algorithm, first data $r_f$ corresponding to the to-be-measured packet and in the second measurement data.

5. The traffic measurement method according to claim 4, wherein the modifying, based on the to-be-measured information and the second algorithm, first data $r_f$ corresponding to the to-be-measured packet and in the second measurement data comprises:
    when the flow table comprises a flow identifier f of the to-be-measured packet, updating first data $r_f$ corresponding to the to-be-measured packet and in the flow table to a sum of the first data $r_f$ corresponding to the to-be-measured packet and the traffic volume of the to-be-measured packet.

6. The traffic measurement method according to claim 1, wherein a flow table is stored in the packet processing device, wherein the second measurement data comprises data in the flow table, wherein the flow table comprises a correspondence between the flow identifier and each of first data r and second data d, and wherein when the flow table does not comprise a flow identifier f of the to-be-measured packet and the flow table is full, before the modifying, based on the to-be-measured information and a second algorithm, w pieces of data in second measurement data corresponding to the to-be-measured packet, the method further comprises:
    calculating a decrement value ê;
    updating first data r corresponding to each flow identifier comprised in the flow table to a difference between the first data r and the decrement value ê;
    updating second data d corresponding to each flow identifier comprised in the flow table to a sum of the second data d and the decrement value ê; and
    deleting, from the flow table, a correspondence between a flow identifier meeting a first preset condition and each of the first data r and the second data d, wherein the flow identifier meeting the first preset condition includes a flow identifier whose corresponding updated first data r is less than or equal to 0.

7. The traffic measurement method according to claim 6, wherein the flow table comprises a correspondence between the flow identifier and each of the first data r, the second data d, and third data e, and wherein when the flow table does not comprise the flow identifier f of the to-be-measured packet and the flow table is full, the modifying, based on the to-be-measured information and a second algorithm, w pieces of data in second measurement data corresponding to the to-be-measured packet comprises:
    if the traffic volume of the to-be-measured packet is greater than the decrement value ê, setting a difference between the traffic volume of the to-be-measured packet and the decrement value ê to first data $r_f$ corresponding to the to-be-measured packet;
    setting the decrement value ê to second data $d_f$ corresponding to the to-be-measured packet;
    setting a total decrement traffic volume E to third data $e_f$ corresponding to the to-be-measured packet; and
    inserting, into the flow table, a correspondence between the flow identifier f of the to-be-measured packet and each of the first data $r_f$ corresponding to the to-be-measured packet, the second data $d_f$ corresponding to the to-be-measured packet, and the third data $e_f$ corresponding to the to-be-measured packet.

8. The traffic measurement method according to claim 7, wherein the method further comprises:
    updating the total decrement traffic volume E to a sum of the total decrement traffic volume E and the decrement value ê.

9. The traffic measurement method according to claim 6, wherein the calculating a decrement value ê comprises:
   sorting the traffic volume of the to-be-measured packet and the first data r corresponding to flow identifiers comprised in the flow table in order of values, and denoting the first two values after sorting as Ri and R2 and a last value after sorting as Rk; and
   calculating the decrement value e based on Ri, R2, Rk, and the following expression:

$$\hat{e} = \sqrt[\theta]{1 - \delta R_k}, \text{ wherein } \theta = \log_b \frac{1}{2}, b = \frac{R_1 - 1}{R_2 - 1},$$

10. The traffic measurement method according to claim 1, wherein a flow table is stored in the packet processing device, wherein the second measurement data comprises data in the flow table, wherein the flow table comprises a correspondence between the flow identifier and each of first data r and third data e, and wherein when the flow table does not comprise a flow identifier f of the to-be-measured packet and the flow table is not full, the modifying, based on the to-be-measured information and a second algorithm, w pieces of data in second measurement data corresponding to the to-be-measured packet comprises:
   setting the traffic volume of the to-be-measured packet to first data $r_f$ corresponding to the to-be-measured packet;
   setting a total decrement traffic volume E to third data $e_f$ corresponding to the to-be-measured packet; and
   inserting, into the flow table, a correspondence between the flow identifier f of the to-be-measured packet and each of the first data $r_f$ corresponding to the to-be-measured packet and the third data $e_f$ corresponding to the to-be-measured packet.

11. A packet processing device, comprising at least one processor, a memory, a buffer, a communications interface, and a bus, wherein the at least one processor, the memory, and the buffer are connected to each other by using the bus;
   wherein the communications interface is configured to obtain a to-be-measured packet when the packet processing device is a packet forwarding device or a packet receive-end device;
   wherein the memory is configured to store an instruction;
   wherein the at least one processor is configured to invoke the instruction stored in the memory to implement the following operations:
      obtaining a to-be-measured packet when the packet processing device is a packet transmit-end device;
      in response to determining that occupied storage space in the buffer is less than a preset threshold;
      writing to-be-measured information of the to-be-measured packet into the buffer, wherein the to-be-measured information comprises a flow identifier of the to-be-measured packet and a traffic volume of the to-be-measured packet;
      reading the to-be-measured information from the buffer; and
      modifying, based on the to-be-measured information and a first algorithm, a pieces of data in first measurement data corresponding to the to-be-measured packet, wherein a is a positive integer; and
      in response to determining that occupied storage space in the buffer is greater than or equal to the preset threshold, modifying, based on the to-be-measured information and a second algorithm, w pieces of data in second measurement data corresponding to the to-be-measured packet, wherein w is a positive integer, and wherein w is less than a; and
   wherein the buffer is configured to store the to-be-measured information after the at least one processor writes the to-be-measured information of the to-be-measured packet into the buffer.

12. The packet processing device according to claim 11, wherein the a pieces of data include values of a counters, and wherein the w pieces of data include values of w counters.

13. The packet processing device according to claim 11, wherein the first algorithm comprises a hash function, wherein the first measurement data comprises data in c locations, wherein c is a positive integer, and wherein the at least one processor is configured to:
   determine u locations from the c locations based on the flow identifier of the to-be-measured packet and the hash function, wherein u is a positive integer, and wherein u is less than or equal to c; and
   modify a pieces of data in the u locations based on the traffic volume of the to-be-measured packet, wherein u is less than or equal to a.

14. The packet processing device according to claim 11, wherein the communications interface is further configured to:
   send at least one of the first measurement data or the second measurement data to a network controller, wherein at least one of the first measurement data or the second measurement data is used by the network controller to calculate target measurement data.

15. The packet processing device according to claim 14, wherein the flow identifier of the to-be-measured packet is a target flow identifier, and wherein the communications interface is further configured to:
   before obtaining the to-be-measured packet, receive an instruction message sent by the network controller, wherein the instruction message comprises the target flow identifier.

* * * * *